US010439663B2

(12) United States Patent
Islam et al.

(10) Patent No.: US 10,439,663 B2
(45) Date of Patent: Oct. 8, 2019

(54) METHODS AND APPARATUS FOR PHASE NOISE ESTIMATION IN DATA SYMBOLS FOR MILLIMETER WAVE COMMUNICATIONS

(71) Applicant: QUALCOMM Incorporated, San Diego, CA (US)

(72) Inventors: Muhammad Nazmul Islam, Edison, NJ (US); Tao Luo, San Diego, CA (US); Sundar Subramanian, Bridgewater, NJ (US); Juergen Cezanne, Ocean Township, NJ (US); Bilal Sadiq, Basking Ridge, NJ (US); Navid Abedini, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 15/476,511

(22) Filed: Mar. 31, 2017

(65) Prior Publication Data

US 2017/0294926 A1    Oct. 12, 2017

Related U.S. Application Data

(60) Provisional application No. 62/337,774, filed on May 17, 2016, provisional application No. 62/337,257, (Continued)

(51) Int. Cl.
*H04L 5/00* (2006.01)
*H04B 1/10* (2006.01)
(Continued)

(52) U.S. Cl.
CPC .......... *H04B 1/1027* (2013.01); *H04B 7/063* (2013.01); *H04B 7/0678* (2013.01);
(Continued)

(58) Field of Classification Search
CPC .................................................. H04B 1/1027
(Continued)

(56) References Cited

U.S. PATENT DOCUMENTS 7,292,652 B2 * 11/2007 Luo ..................... H04L 27/0014
                                                    375/316
7,469,106 B2 * 12/2008 Feced ................. H04B 10/2575
                                                    398/183
(Continued)

OTHER PUBLICATIONS

International Search Report and Written Opinion—PCT/US2017/025640—ISA/EPO—dated Jul. 5, 2017.

*Primary Examiner* — James M Perez
(74) *Attorney, Agent, or Firm* — Patterson & Sheridan, LLP

(57) ABSTRACT

Certain aspects of the present disclosure relate to methods and apparatus for phase noise estimation in data symbols for millimeter wave (mmW). A method for wireless communications by a transmitting device is provided. The method generally includes identifying a phase noise metric associated with at least one receiving device; determining a phase noise pilot configuration based, at least in part, on the identified phase noise metric; and providing an indication of the phase noise pilot configuration to the at least one receiving device. A receiving device can receive the phase noise pilots in accordance with the configuration and determine phase noise for a data symbol based on the received phase noise pilots.

23 Claims, 17 Drawing Sheets

Related U.S. Application Data filed on May 16, 2016, provisional application No. 62/323,431, filed on Apr. 15, 2016, provisional application No. 62/319,280, filed on Apr. 6, 2016.

(51) Int. Cl.
*H04B 17/336* (2015.01)
*H04B 7/06* (2006.01)
*H04J 13/00* (2011.01)
*H04L 1/00* (2006.01)
*H04W 72/04* (2009.01)

(52) U.S. Cl.
CPC ........ *H04B 17/336* (2015.01); *H04J 13/0074* (2013.01); *H04L 1/0003* (2013.01); *H04L 1/0009* (2013.01); *H04L 5/0048* (2013.01); *H04W 72/042* (2013.01); *H04J 2013/0088* (2013.01)

(58) Field of Classification Search
USPC ............... 375/224–226, 259–285, 295–296, 375/316–352
See application file for complete search history.

(56) References Cited

U.S. PATENT DOCUMENTS

| | | | | |
|---|---|---|---|---|
| 8,331,506 B2* | 12/2012 | Park | H04L 27/3863 | 375/259 |
| 8,340,167 B2* | 12/2012 | Feng | H04B 17/21 | 375/226 |
| 8,416,759 B1* | 4/2013 | Narasimhan | H04W 56/0035 | 370/344 |
| 8,498,350 B2* | 7/2013 | Stern | H04L 27/2613 | 370/203 |
| 8,654,623 B2* | 2/2014 | Luo | H04J 11/0069 | 307/328 |
| 9,048,988 B2* | 6/2015 | Murakami | H04L 27/2613 | 375/295 |
| 9,288,021 B2* | 3/2016 | Zhang | H04L 1/1614 | |
| 9,392,588 B2* | 7/2016 | Zhang | H04L 1/1614 | |
| 9,585,044 B2* | 2/2017 | Park | H04W 24/10 | |
| 10,097,254 B2* | 10/2018 | Islam | H04B 7/0626 | |
| 10,097,255 B2* | 10/2018 | Cezanne | H04B 7/0667 | |
| 10,116,483 B2* | 10/2018 | Islam | H04L 5/0048 | |
| 10,129,052 B2* | 11/2018 | Subramanian | H04L 25/0236 | |
| 10,149,321 B2* | 12/2018 | Islam | H04W 76/10 | |
| 10,177,941 B2* | 1/2019 | Oh | H04L 25/03012 | |
| 10,263,748 B2* | 4/2019 | Wang | H04L 5/0051 | |
| 2002/0159533 A1* | 10/2002 | Crawford | H04L 27/2657 | 375/260 |
| 2005/0084036 A1* | 4/2005 | Luo | H04L 27/0014 | 375/316 |
| 2007/0047634 A1* | 3/2007 | Kang | H03D 3/008 | 375/226 |
| 2007/0123188 A1* | 5/2007 | Mo | H03D 3/009 | 455/302 |
| 2008/0101497 A1* | 5/2008 | Gaikwad | H04B 7/0413 | 375/267 |
| 2009/0323957 A1* | 12/2009 | Luo | H04J 11/0069 | 380/270 |
| 2012/0002596 A1* | 1/2012 | Kim | H04B 7/0413 | 370/315 |
| 2013/0107832 A1* | 5/2013 | Kim | H04B 7/024 | 370/329 |
| 2013/0188579 A1* | 7/2013 | Touboul | H04B 7/0413 | 370/329 |
| 2013/0194931 A1* | 8/2013 | Lee | H04L 5/0053 | 370/241 |
| 2013/0322570 A1* | 12/2013 | Harada | H04B 17/345 | 375/340 |
| 2014/0023155 A1* | 1/2014 | Khoryaev | H04L 25/08 | 375/260 |
| 2014/0036860 A1* | 2/2014 | Ma | H04L 27/2657 | 370/330 |
| 2014/0044043 A1* | 2/2014 | Moshfeghi | H04W 84/00 | 370/328 |
| 2014/0062609 A1* | 3/2014 | Lee | H03B 5/364 | 331/116 FE |
| 2014/0133333 A1* | 5/2014 | Liu | H04W 24/10 | 370/252 |
| 2014/0133336 A1* | 5/2014 | Park | H04W 24/10 | 370/252 |
| 2014/0286463 A1* | 9/2014 | Reingold | H04B 7/0456 | 375/347 |
| 2014/0295909 A1* | 10/2014 | Ouchi | H04W 52/242 | 455/522 |
| 2014/0301301 A1* | 10/2014 | Cheng | H04L 5/0048 | 370/329 |
| 2014/0321406 A1* | 10/2014 | Marinier | H04B 7/024 | 370/329 |
| 2014/0376482 A1* | 12/2014 | Kim | H04B 7/024 | 370/329 |
| 2015/0016408 A1* | 1/2015 | Yang | H04L 5/001 | 370/330 |
| 2015/0146644 A1* | 5/2015 | Kim | H04L 5/0048 | 370/329 |
| 2015/0146806 A1* | 5/2015 | Terry | H04L 25/0204 | 375/260 |
| 2015/0244508 A1* | 8/2015 | Kim | H04L 5/0023 | 370/329 |
| 2015/0311986 A1* | 10/2015 | Thomas | H04B 17/345 | 375/230 |
| 2015/0382223 A1* | 12/2015 | Ko | H04B 7/0456 | 370/252 |
| 2016/0006594 A1* | 1/2016 | Persson | H04L 5/0044 | 375/308 |
| 2016/0057742 A1* | 2/2016 | Berggren | H04L 5/0048 | 370/329 |
| 2016/0081072 A1* | 3/2016 | Zhang | H04L 1/1614 | 370/280 |
| 2016/0135170 A1* | 5/2016 | Chen | H04W 72/0413 | 370/336 |
| 2016/0205664 A1* | 7/2016 | Zhang | H04L 5/00 | |
| 2016/0211999 A1* | 7/2016 | Wild | H04L 27/264 | |
| 2016/0285667 A1* | 9/2016 | Deng | H04L 27/2666 | |
| 2017/0005715 A1* | 1/2017 | Cezanne | H04B 7/0667 | |
| 2017/0048086 A1* | 2/2017 | Subramanian | H04L 25/0236 | |
| 2017/0141896 A1* | 5/2017 | Yang | H04L 5/0048 | |
| 2017/0163325 A1* | 6/2017 | Kang | H04B 7/0617 | |
| 2017/0214518 A1* | 7/2017 | Oh | H04L 25/03012 | |
| 2017/0280444 A1* | 9/2017 | Da Silva | H04L 5/0048 | |
| 2017/0290046 A1* | 10/2017 | Sun | H04W 74/006 | |
| 2017/0294926 A1* | 10/2017 | Islam | H04B 17/336 | |
| 2017/0302352 A1* | 10/2017 | Islam | H04B 7/0626 | |
| 2017/0302479 A1* | 10/2017 | Mysore Balasubramanya | H04L 1/0054 | |
| 2017/0302495 A1* | 10/2017 | Islam | H04L 5/0048 | |
| 2017/0331577 A1* | 11/2017 | Parkvall | H04J 11/0079 | |
| 2018/0041259 A1* | 2/2018 | Kim | H04B 7/0456 | |
| 2018/0041321 A1* | 2/2018 | Guo | H04L 5/0048 | |
| 2018/0048413 A1* | 2/2018 | Liu | H04J 11/0069 | |
| 2018/0077603 A1* | 3/2018 | John Wilson | H04W 72/0406 | |
| 2018/0091350 A1* | 3/2018 | Akkarakaran | G01S 13/346 | |
| 2018/0092053 A1* | 3/2018 | Lee | H04B 7/04 | |
| 2018/0098355 A1* | 4/2018 | Islam | H04W 76/10 | |
| 2018/0115963 A1* | 4/2018 | Luo | H04L 27/2602 | |
| 2018/0123897 A1* | 5/2018 | Lee | H04B 7/02 | |
| 2018/0124796 A1* | 5/2018 | Noh | H04B 1/1027 | |
| 2018/0131488 A1* | 5/2018 | Noh | H04L 5/0082 | |
| 2018/0132122 A1* | 5/2018 | Yoo | H04L 5/0053 | |
| 2018/0145854 A1* | 5/2018 | Akkarakaran | H04L 5/0048 | |
| 2018/0145861 A1* | 5/2018 | Lee | H04L 27/2643 | |
| 2018/0205528 A1* | 7/2018 | Bai | H04L 5/0005 | |
| 2018/0205585 A1* | 7/2018 | Sadiq | H04L 5/0023 | |
| 2018/0205589 A1* | 7/2018 | Bai | H04L 5/0035 | |
| 2018/0212800 A1* | 7/2018 | Park | H04L 1/00 | |
| 2018/0220448 A1* | 8/2018 | Akkarakaran | H04L 5/0023 | |
| 2018/0242324 A1* | 8/2018 | Luo | H04L 25/03866 | |
| 2018/0343046 A1* | 11/2018 | Park | H04W 76/27 | |

(56) References Cited

U.S. PATENT DOCUMENTS

| | | | |
|---|---|---|---|
| 2018/0351719 A1* | 12/2018 | Lee | H04L 5/0048 |
| 2018/0359069 A1* | 12/2018 | Nam | H04L 5/0048 |
| 2018/0359071 A1* | 12/2018 | Lee | H04L 7/0054 |
| 2018/0368013 A1* | 12/2018 | Yoo | H04L 5/0048 |
| 2019/0036666 A1* | 1/2019 | Li | H04L 1/0004 |
| 2019/0052344 A1* | 2/2019 | Kundargi | H04B 7/0814 |
| 2019/0068428 A1* | 2/2019 | Islam | H04L 5/0048 |
| 2019/0069192 A1* | 2/2019 | Palenius | H04W 24/10 |
| 2019/0081825 A1* | 3/2019 | Pajukoski | H04L 25/03 |
| 2019/0109749 A1* | 4/2019 | Bai | H04L 27/2628 |
| 2019/0124692 A1* | 4/2019 | Islam | H04W 76/10 |
| 2019/0132827 A1* | 5/2019 | Kundargi | H04W 72/046 |
| 2019/0132828 A1* | 5/2019 | Kundargi | H04W 72/046 |

* cited by examiner

METHODS AND APPARATUS FOR PHASE NOISE ESTIMATION IN DATA SYMBOLS FOR MILLIMETER WAVE COMMUNICATIONS

CROSS-REFERENCE TO RELATED APPLICATION & PRIORITY CLAIM

This application claims benefit of and priority to U.S. Provisional Patent Application Ser. No. 62/319,280, filed Apr. 6, 2016, to U.S. Provisional Patent Application Ser. No. 62/323,431, filed Apr. 15, 2016, to U.S. Provisional Patent Application Ser. No. 62/337,257, filed May 16, 2016, and to U.S. Provisional Patent Application Ser. No. 62/337,774, filed May 17, 2016, which are herein incorporated by reference in their entirety for all applicable purposes.

BACKGROUND

Field of the Disclosure

Certain aspects of the present disclosure generally relate to wireless communications and, more particularly, to techniques for phase noise estimation in data symbols in millimeter wave (mmW).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, access point (AP), radio head, transmit receive point (TRP), new radio (NR) BS, 5G Node B, etc.).

These multiple access technologies have been adopted in various telecommunication standards to provide a common protocol that enables different wireless devices to communicate on a municipal, national, regional, and even global level. New radio (NR), which may also be referred to as 5G, is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to techniques and apparatus for phase noise estimation in data symbols in millimeter wave (mmW).

According to certain aspects, a method is provided that may be performed by a transmitting device, such as a base station (BS). The method generally includes identifying a phase noise metric associated with at least one receiving device; determining a phase noise pilot configuration based, at least in part, on the identified phase noise metric; and providing an indication of the phase noise pilot configuration to the at least one receiving device.

According to certain aspects, a method is provided that may be performed by a receiving device, such as a user equipment (UE). The method generally includes receiving an indication of a phase noise pilot configuration from a transmitting device; receiving phase noise pilots in at least one data symbol according to the phase noise pilot configuration; and determining a phase noise value associated with the at least one data symbol based on the phase noise pilots received in that symbol.

According to certain aspects, an apparatus is provided that may be a transmitting device, such as a BS. The apparatus generally includes means for identifying a phase noise metric associated with at least one receiving device; means for determining a phase noise pilot configuration based, at least in part, on the identified phase noise metric; and means for providing an indication of the phase noise pilot configuration to the at least one receiving device.

According to certain aspects, an apparatus is provided that may be a receiving device, such as a UE. The apparatus generally includes means for receiving an indication of a phase noise pilot configuration from a transmitting device; means for receiving phase noise pilots in at least one data symbol according to the phase noise pilot configuration; and means for determining a phase noise value associated with the at least one data symbol based on the phase noise pilots received in that symbol.

According to certain aspects, an apparatus is provided that may be a transmitting device, such as a BS. The apparatus generally includes at least one processor coupled with a memory and configured to identify a phase noise metric associated with at least one receiving device; determine a phase noise pilot configuration based, at least in part, on the identified phase noise metric; and provide an indication of the phase noise pilot configuration to the at least one receiving device.

According to certain aspects, an apparatus is provided that may be a receiving device, such as a UE. The apparatus generally includes a receiver configured to receive an indication of a phase noise pilot configuration from a transmitting device and receive phase noise pilots in at least one data symbol according to the phase noise pilot configuration; and at least one processor coupled with a memory and configured to determine a phase noise value associated with the at least one data symbol based on the phase noise pilots received in that symbol.

According to certain aspects, computer readable medium is provided having computer executable code stored thereon for wireless communications by a transmitting device, such as a BS. The computer executable code generally includes code for identifying a phase noise metric associated with at least one receiving device; code for determining a phase noise pilot configuration based, at least in part, on the identified phase noise metric; and code for providing an indication of the phase noise pilot configuration to the at least one receiving device.

According to certain aspects, computer readable medium is provided having computer executable code stored thereon for wireless communications by a receiving device, such as a UE. The computer executable code generally includes code for receiving an indication of a phase noise pilot configuration from a transmitting device; code for receiving phase noise pilots in at least one data symbol according to the phase noise pilot configuration; and code for determining a phase noise value associated with the at least one data symbol based on the phase noise pilots received in that symbol.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
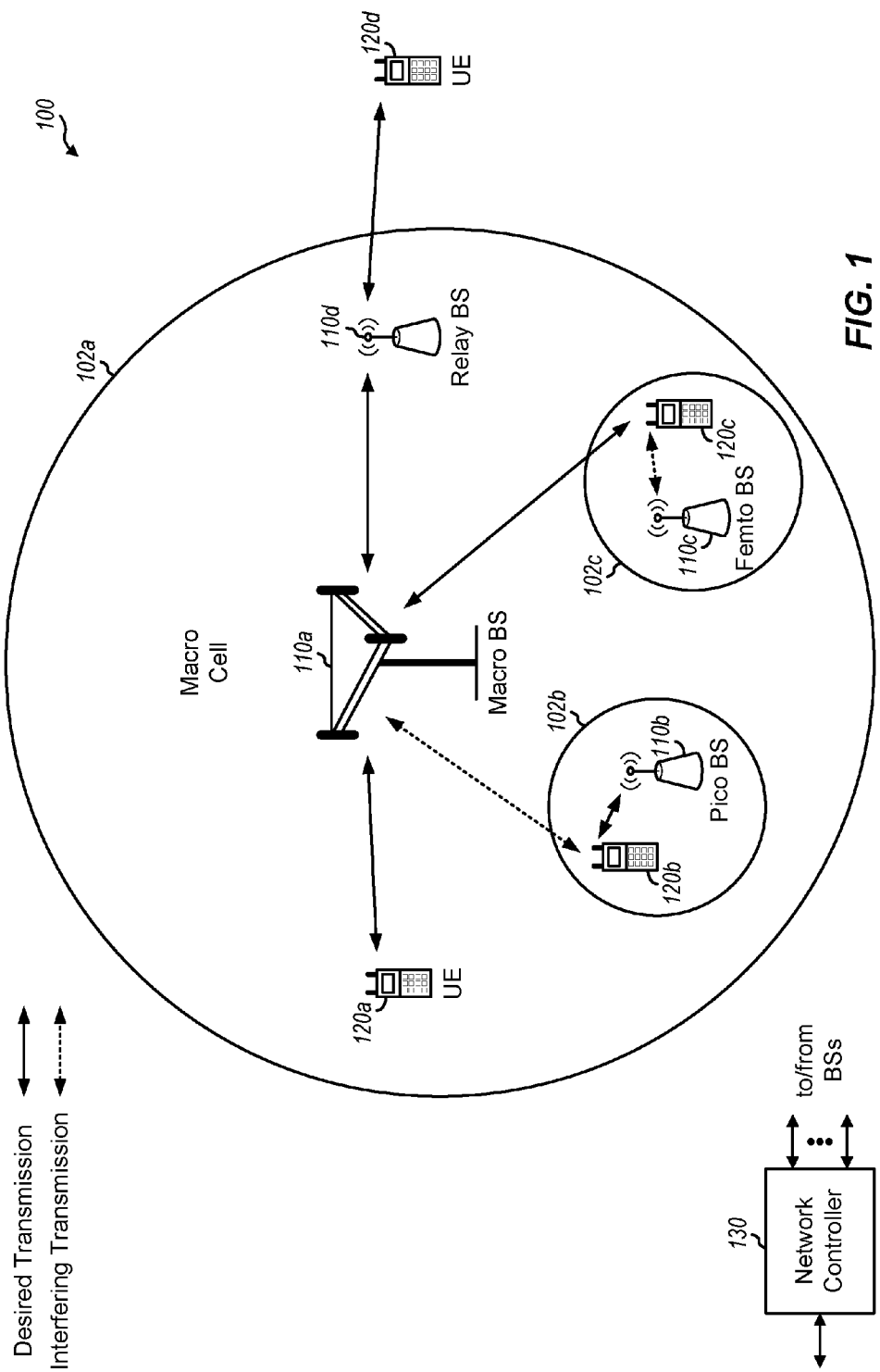
FIG. 1 is a block diagram illustrating an example of a wireless communication network, in accordance with certain aspects of the disclosure.

Next generation cellular communication systems, such as new radio (NR) or 5G systems may utilize millimeter wave (mmW) wireless communication. mmW communication may involve using frequencies (e.g., channels) in the 20 GHz range or greater. In such systems, phase noise becomes more pronounced (e.g., relative to conventional communication systems) due to various factors including, for example, small symbol size, high frequency ratio between oscillators, use of lower quality parts in some devices (e.g., user equipments (UEs)), etc. Phase noise surrounds an RF carrier generated by an oscillator. It is the equivalent of random Am and FM modulations appearing on adjacent frequencies surrounding the RF sine wave. Phase noise is the frequency domain representation of rapid, short-term, random fluctuations in the phase of a waveform, caused by time domain instabilities (e.g., jitter). In some examples, phase noise in a mmW communication channel may cause interference within the period of a single signal. Conventional phase noise estimation and mitigation techniques may not adequately address the phase noise concerns raised by high frequency wireless communication systems.

Certain aspects of the present disclosure discuss techniques for phase noise estimation in data symbols in mmW communication systems. For example, aspects of the disclosure provide phase noise reference signal configurations (e.g., presence, absence, and/or pilot tone patterns) and techniques for determining the configuration and/or providing an indication of the configuration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE. It is noted that while aspects may be described herein using terminology commonly associated with 3G and/or 4G wireless technologies, aspects of the present disclosure can be applied in other generation-based communication systems, such as 5G and later, including NR technologies.

An Example Wireless Communication System

FIG. 1 is a diagram illustrating a wireless communication system 100 in which aspects of the present disclosure may be practiced. For example, the BS 110 may be configured to identify a phase noise metric associated with at least one of the UEs 120. The BS 110 may determine a phase noise pilot configuration based, at least in part, on the identified phase noise metric and the BS 110 may provide an indication of the phase noise pilot configuration to the at least one UE 120. The UE 120 may receive phase noise pilots in accordance with the phase noise pilot configuration and estimate phase noise in a data symbol based on the received phase noise pilots.

Wireless communication system 100 may be a long term evolution (LTE) network or some other wireless network, such as a 5G or new radio (NR) network. Wireless communication network 100 may include a number of BSs 110 and other network entities. A BS 110 is an entity that communicates with UEs 120 and may also be referred to as a NR BS, a Node B (NB), an enhanced/evolved NB (eNB), a gNB, a 5G NB, an access point (AP), a transmission reception point (TRP), etc. Each BS 110 may provide communication coverage for a particular geographic area. In 3GPP, the term "cell" can refer to a coverage area of a BS and/or a BS subsystem serving this coverage area, depending on the context in which the term is used.

A BS 110 may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, an BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in wireless communication system 100 through various types of backhaul interfaces such as a direct physical connection, a virtual network, or the like using any suitable transport network.

Wireless communication system 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, relay station 110d may communicate with macro BS 110a and UE 120d in order to facilitate communication between BS 110a and UE 120d. A relay station may also be referred to as a relay BS, a relay, etc.

Wireless communication system 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal (AT), a terminal, a mobile station, a subscriber unit, a station, a subscriber station, a mobile station, a remote station, a user device, a wireless node, a user agent, a remote terminal, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered evolved or enhanced machine-type communication (eMTC) UEs. MTC may refer to communication involving at least one remote device on at least one end of the communication and may include forms of data communication which involve one or more entities that do not necessarily need human interaction. MTC and eMTC UEs include, for example, robots, drones, remote devices, such as sensors, meters, monitors, location tags, etc., that may communicate with a BS, another device (e.g., remote device), or some other entity. A UE may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices. Some UEs may be considered a Customer Premises Equipment (CPE).

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a component carrier, a frequency channel, a tone, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs. In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

Figure 2:
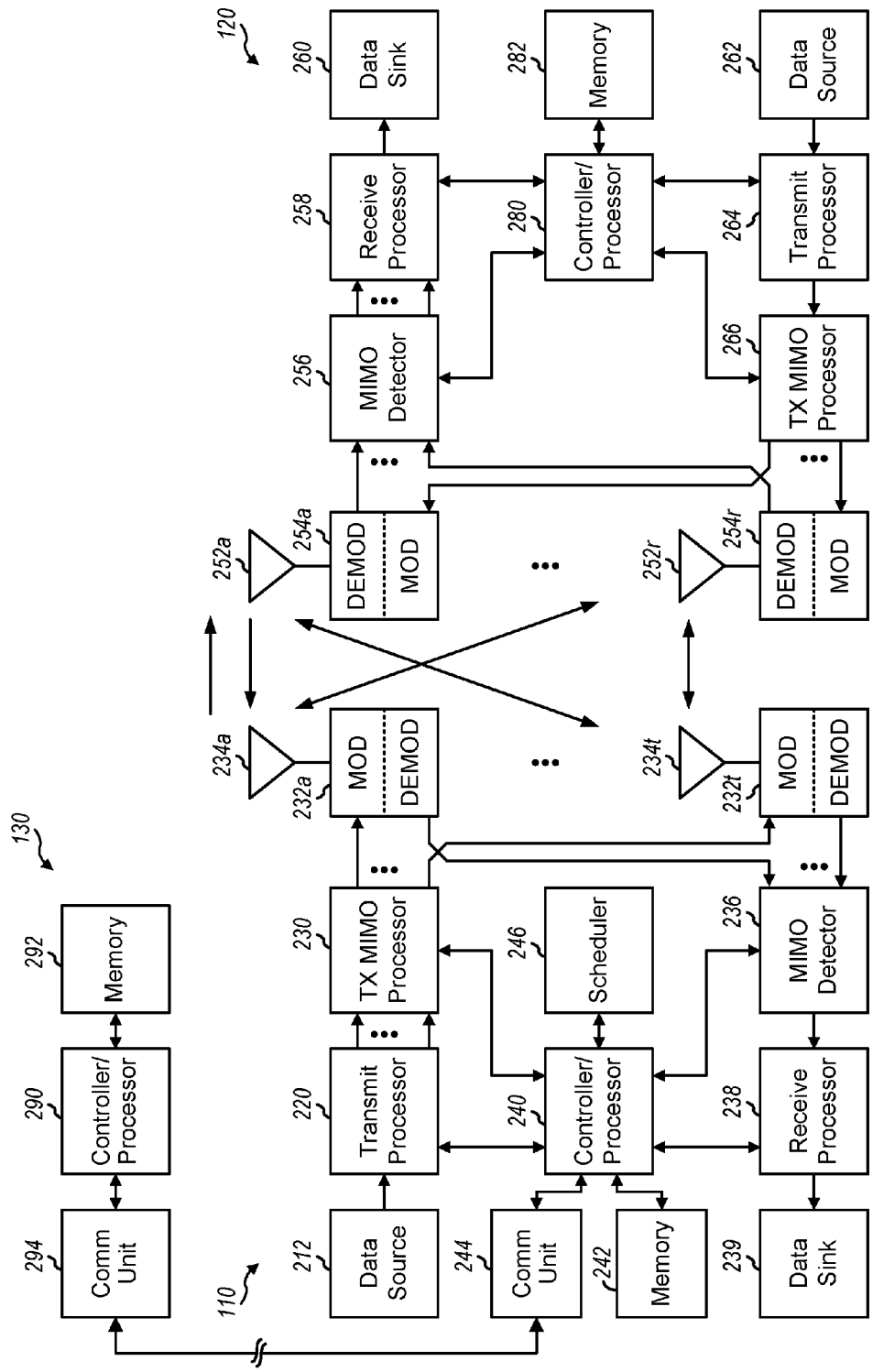
FIG. 2 is a block diagram illustrating an example of a base station (BS) in communication with a user equipment (UE) in a wireless communication network, in accordance with certain aspects of the disclosure.

FIG. 2 shows a block diagram of a design of BS 110 and UE 120, which may be one of the BSs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for location encoding for synchronization signals to convey additional information and a BS. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120, and/or controller/processor 240 and/or other controllers/processors and modules at BS 110 may perform or direct operations 1000 and 1100 shown in FIGS. 10 and 11, respectively. Memories 242 and 282 may store data and program codes for BS 110 and UE 120, respectively. A scheduler 246 may schedule UEs for data transmission on the downlink and/or uplink.

Figure 3:
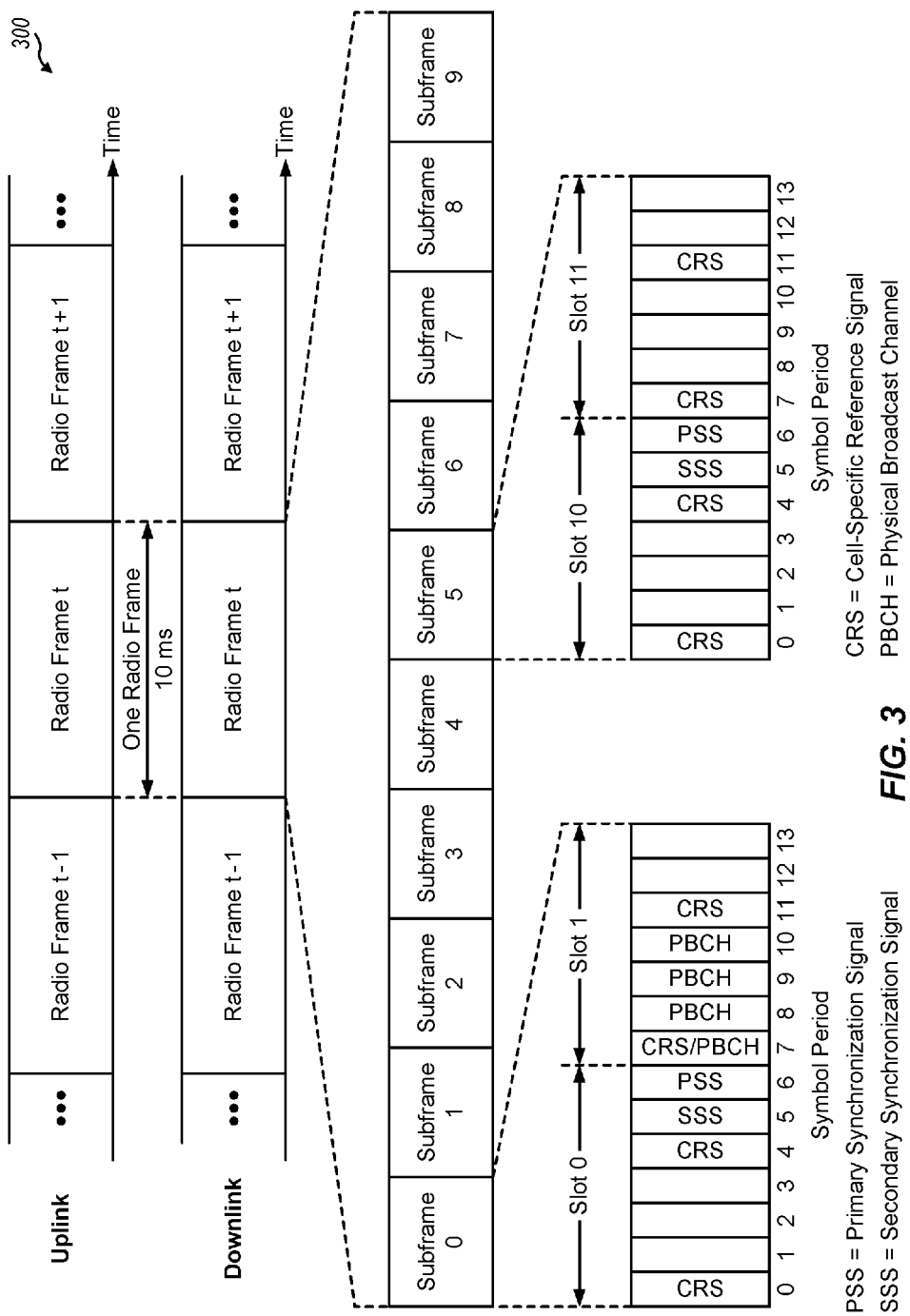
FIG. 3 is a block diagram illustrating an example of a frame structure for communication in a wireless communication network, in accordance with certain aspects of the disclosure.

FIG. 3 shows an exemplary frame structure 300 for frequency division duplexing (FDD) in an example wireless communication system (e.g., wireless communication system 100). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1.

In certain systems (e.g., LTE), a BS may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a BS may transmit these or other signals in these locations or in different locations of the subframe.

Figure 4:
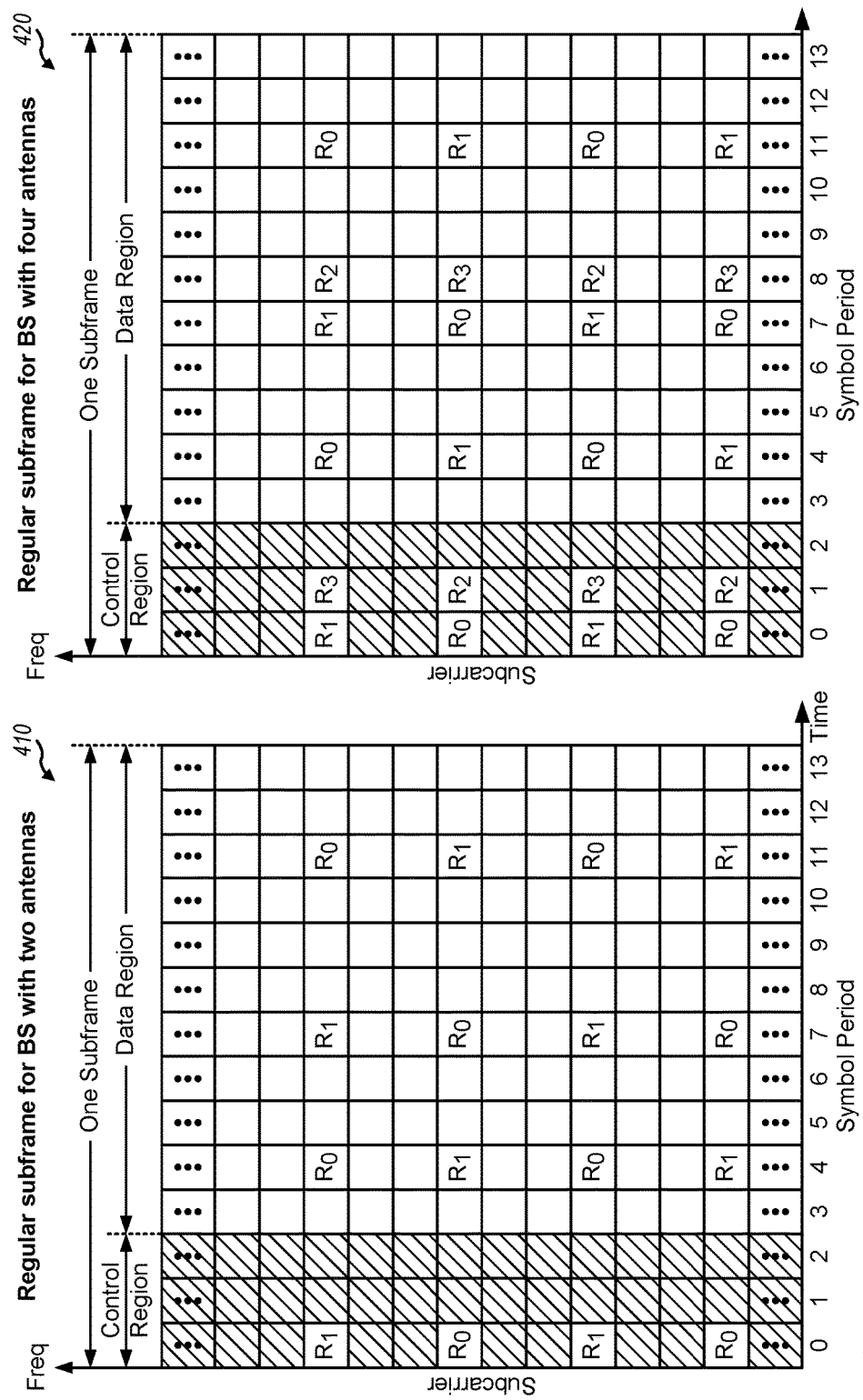
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain wireless communication systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A wireless communication system may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

Example NR/5G RAN Architecture

While aspects of the examples described herein may be associated with LTE technologies, aspects of the present disclosure may be applicable with other wireless communications systems, such as new radio (NR) or 5G technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier (CC) bandwidth of 100 MHZ may be supported. NR RBs may span 12 subcarriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmit receive point (TRP), access point (AP), etc.) may correspond to one or multiple BSs. NR cells can be configured as access cells (ACells) or data only cells (DCells). DCells may be cells used for carrier aggregation or dual connectivity, but not used for initial access, cell selection/reselection, or handover. Based on the cell type indication, the UE may communicate with the NR BS. For example, the UE may determine NR BSs to consider for cell selection, access, handover, and/or measurement based on the indicated cell type.

Figure 5:
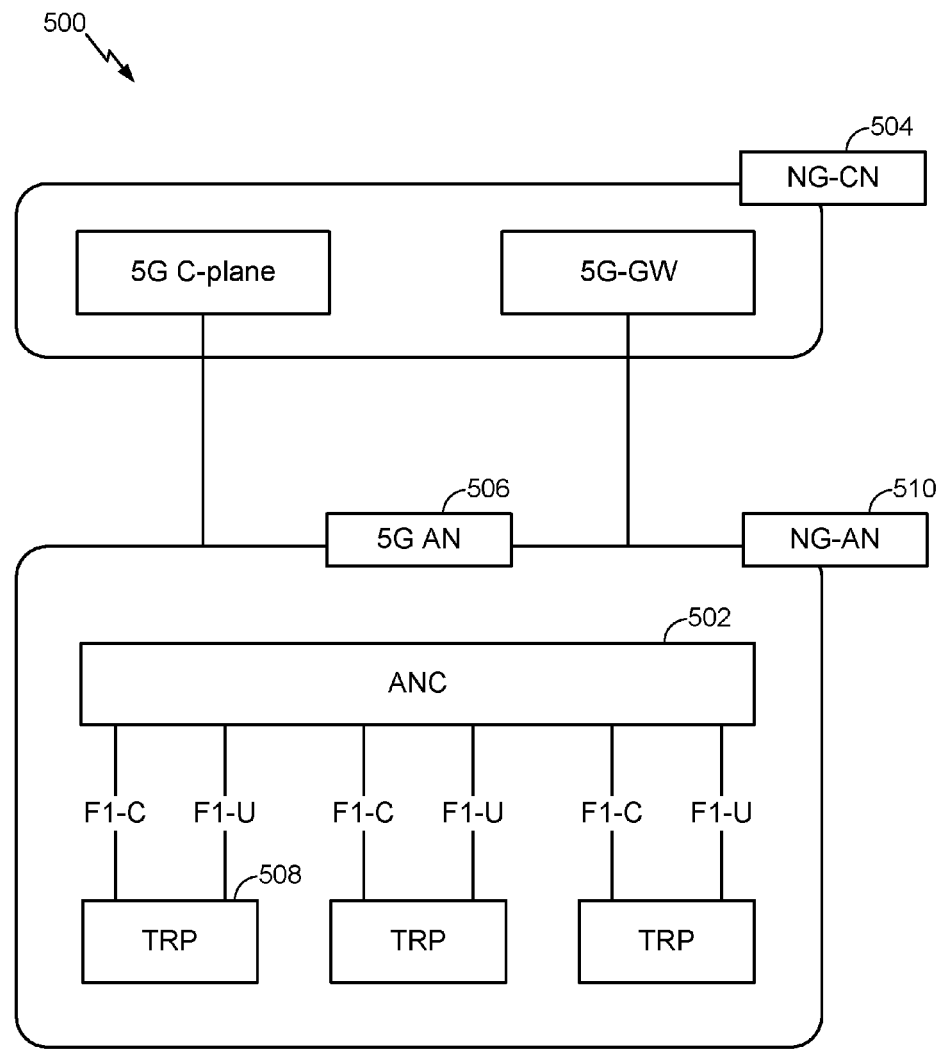
FIG. 5 illustrates an example logical architecture of a distributed radio access network (RAN), in accordance with certain aspects of the present disclosure.

FIG. 5 illustrates logical architecture of an example distributed RAN 500 in NR, according to aspects of the present disclosure. A 5G access node (AN) 506 may include an access node controller (ANC) 502. ANC 502 may be a CU of the distributed RAN 500. A backhaul interface to the next generation core network (NG-CN) 504 may terminate at ANC 502. The backhaul interface to neighboring next generation access nodes (NG-ANs) 510 may terminate at ANC 502. ANC 502 may include one or more TRPs 508. As described above, a TRP may be used interchangeably with "cell", BS, etc.

TRPs 508 may comprise a DU. TRPs 508 may be connected to one ANC (e.g., ANC 502) or more than one ANC (not illustrated). For example, for RAN sharing, radio as a service (RaaS), and service specific AND deployments, TRPs 508 may be connected to more than one ANC. A TRP 508 may include one or more antenna ports. The TRPs 508 may be configured to individually (e.g., dynamic selection) or jointly (e.g., joint transmission) serve traffic to a UE.

The logical architecture for the distributed RAN 500 may illustrate the fronthaul. The logical architecture may support fronthauling solutions across different deployment types. For example, the logical architecture may be based on transmit network capabilities (e.g., bandwidth, latency, and/or jitter). The logical architecture may share features and/or components with LTE. For example, NG-AN 510 may support dual connectivity with NR, such as a common fronthaul for LTE and NR.

The logical architecture may enable cooperation between and among TRPs 508. For example, cooperation may be preset within a TRP and/or across TRPs via the ANC 502.

There may not be any inter-TRP interface. Logical functions can be dynamically configured for the logical architecture of the distributed RAN 500. Protocols, such as the packet data convergence protocol (PDCP), radio link control (RLC), and/or medium access control (MAC) protocols may be performed adaptively at ANC 502 and/or TRP 508.

Figure 6:
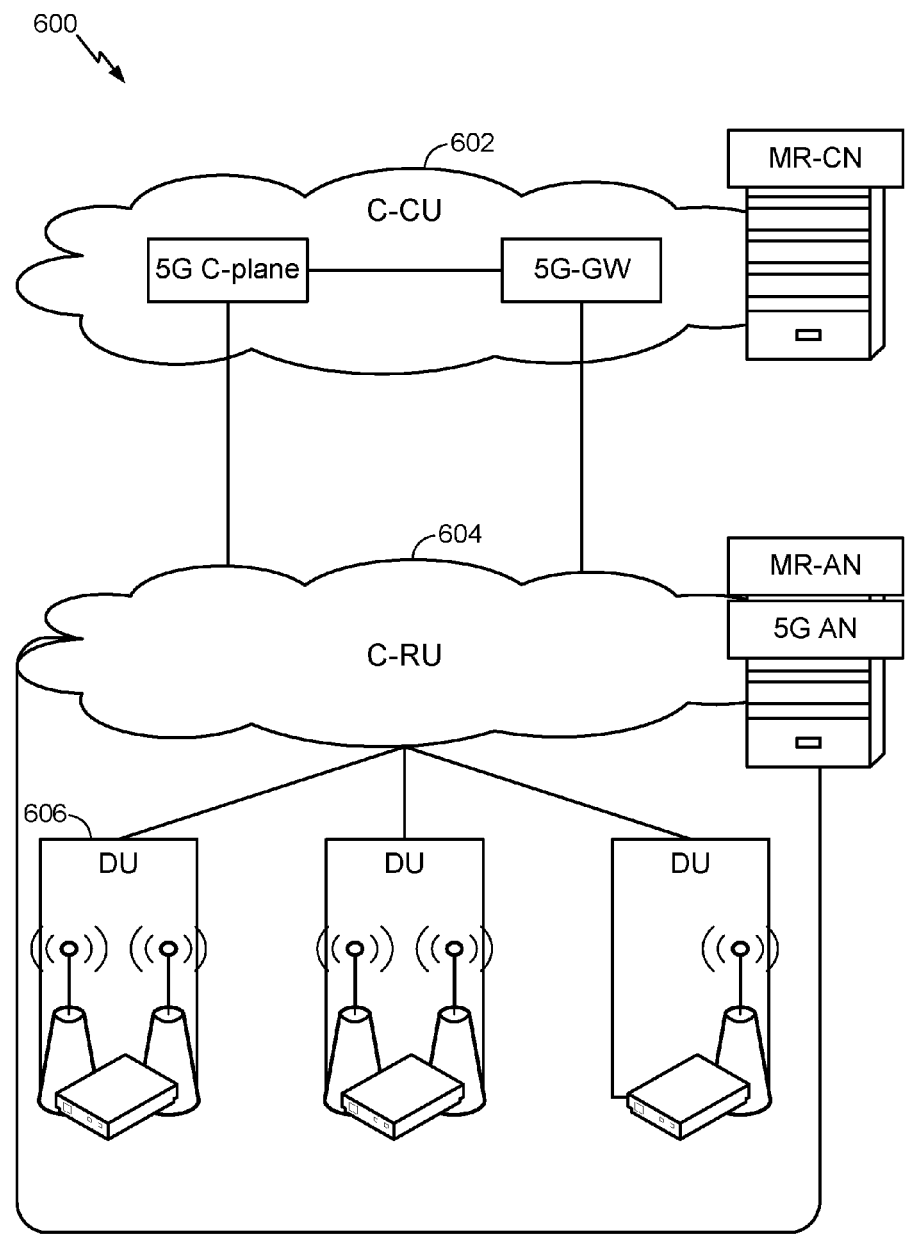
FIG. 6 illustrates an example physical architecture of a distributed RAN, in accordance with certain aspects of the present disclosure.

FIG. 6 illustrates an example physical architecture of a distributed RAN 600 for NR, according to aspects of the present disclosure. A centralized core network unit (C-CU) 602 may host core network functions. C-CU 602 may be centrally deployed. C-CU 602 functionality may be offloaded (e.g., to advanced wireless services (AWS)), in an effort to handle peak capacity.

A centralized RAN unit (C-RU) 604 may host one or more ANC functions. Optionally, C-RU 604 may host core network functions locally. C-RU 604 may have a distributed deployment. C-RU 604 may be near the network edge.

A distributed unit (DU) 606 may host one or more TRPs. DU 606 may be located at edges of the network with radio frequency (RF) functionality.

Figure 7:
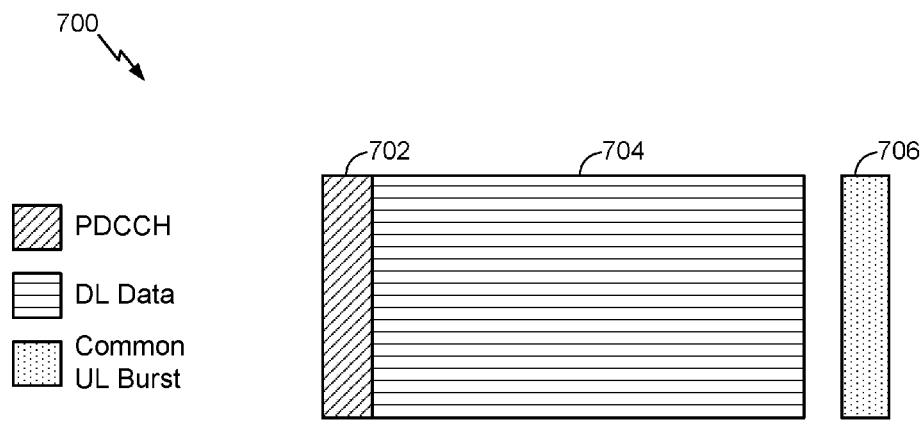
FIG. 7 is a diagram illustrating an example of a downlink (DL)-centric subframe, in accordance with certain aspects of the present disclosure.

FIG. 7 is a diagram showing an example DL-centric subframe 700. DL-centric subframe 700 may include a control portion 702. Control portion 702 may exist in the initial or beginning portion of DL-centric subframe 700. Control portion 702 may include various scheduling information and/or control information corresponding to various portions of DL-centric subframe 700. Control portion 702 may be a physical DL control channel (PDCCH), as shown in FIG. 7. DL-centric subframe 700 may also include a DL data portion 704. DL data portion 704 may be referred to as the payload of DL-centric subframe 700. DL data portion 704 may include the communication resources utilized to communicate DL data from the scheduling entity (e.g., UE or BS) to the subordinate entity (e.g., UE). DL data portion 704 may be a physical DL shared channel (PDSCH).

DL-centric subframe 700 may also include a common UL portion 706. Common UL portion 706 may be referred to as an UL burst, a common UL burst, and/or another term. Common UL portion 706 may include feedback information corresponding to various other portions of DL-centric subframe 700. For example, common UL portion 706 may include feedback information corresponding to control portion 706. Non-limiting examples of feedback information may include an acknowledgment (ACK) signal, a negative acknowledgment (NACK) signal, a HARQ indicator, and/or various other suitable types of information. Common UL portion 706 may include additional or alternative information, such as information pertaining to random access channel (RACH) procedures, scheduling requests (SRs), and/or various other types of information. As illustrated in FIG. 7, the end of DL data portion 706 may be separated in time from the beginning of common UL portion 706. This time separation may be referred to as a gap, a guard period, a guard interval, and/or various other terms. This separation provides time for the switch-over from DL communication (e.g., reception operation by the subordinate entity (e.g., UE)) to UL communication (e.g., transmission by the subordinate entity (e.g., UE). The foregoing is merely one example of a DL-centric subframe and alternative structures having similar features may exist without necessarily deviating from the aspects described herein.

Figure 8:
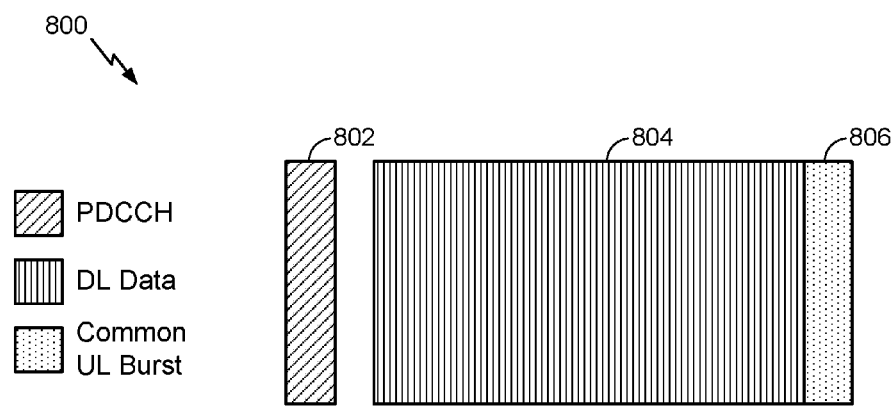
FIG. 8 is a diagram illustrating an example of an uplink (UL)-centric subframe, in accordance with certain aspects of the present disclosure.

FIG. 8 is a diagram showing an example of an UL-centric subframe 800. UL-centric subframe 800 may include a control portion 802. Control portion 802 may exist in the initial or beginning portion of UL-centric subframe 800. Control portion 702 shown in FIG. 8 may be similar to control portion 802 described above with respect to FIG. 7. UL-centric subframe 800 may also include an UL data portion 804. UL data portion 804 may be referred to as the payload of UL-centric subframe 800. UL portion may refer to the communication resources utilized to communicate UL data from the subordinate entity (e.g., UE) to the scheduling entity (e.g., UE or BS). In some configurations, control portion 802 may be a PDCCH.

As illustrated in FIG. 8, the end of control portion 802 may be separated in time from the beginning of UL data portion 804. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric subframe 800 may also include common UL portion 806. Common UL portion 806 in FIG. 8 may be similar to common UL portion 706 described above with reference to FIG. 7. Common UL portion 806 may additionally or alternatively include information pertaining to CQI, sounding reference signals (SRSs), and/or various other suitable types of information. The foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Techniques for Phase Noise Estimation in Data Symbols for Millimeter Wave Communications As discussed above, certain systems, such as new radio (NR) or 5G systems (e.g., wireless communication system 100), may support millimeter wave (mmW) communications. mmW frequency range (e.g., 28 GHz, 40 GHz, 60 GHz, etc.) radios have higher phase noise (e.g., phase variation between carriers) levels than other radios, such as sub-6 GHz radios. The higher phase noise levels may be due to a higher frequency ratio between a local oscillator and a temperature compensated crystal oscillator. The higher phase noise levels may also be due to noisier voltage controlled oscillators. The majority of phase noise may occur at the user equipment (UE) (e.g., the receiver in the downlink). UEs may be made with lower quality parts (e.g., oscillators), which may contribute to phase noise. The phase noise can cause non-negligible variations in phase, for example, over the duration of a single symbol or across symbols.

Figure 9:
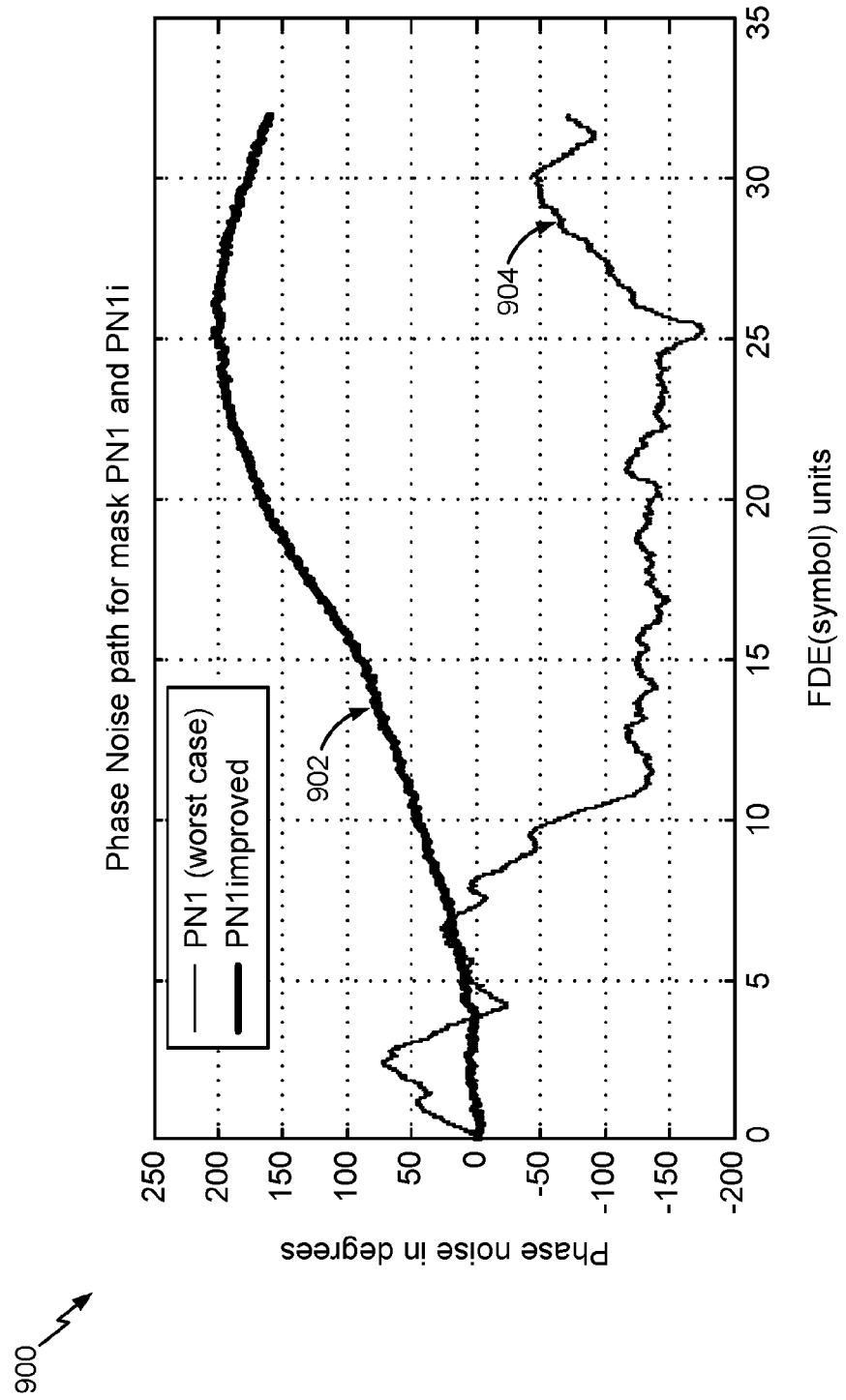
FIG. 9 is graph showing example phase noise for a worst case scenario and a best case scenario.

FIG. 9 is an example graph 900 showing example phase noise for a worst case scenario and a best case scenario. As shown in FIG. 9, in the worst scenario (curve 904), phase variation within one symbol may be non-negligible, and in the best case scenario (curve 902), phase variation within one symbol may be insignificant.

Accordingly, techniques for phase noise estimation in data symbols for mmW communications are desirable.

Aspects of the present disclosure provide technique and apparatus for phase noise estimation in data symbols for mmW using phase noise reference signals (e.g., also referred to herein as phase pilots, phase noise compensation reference signals (PC-RS), phase noise tracking reference signals (PT-RS), phase noise mitigation pilots, phase noise estimation pilots).

Figure 10:
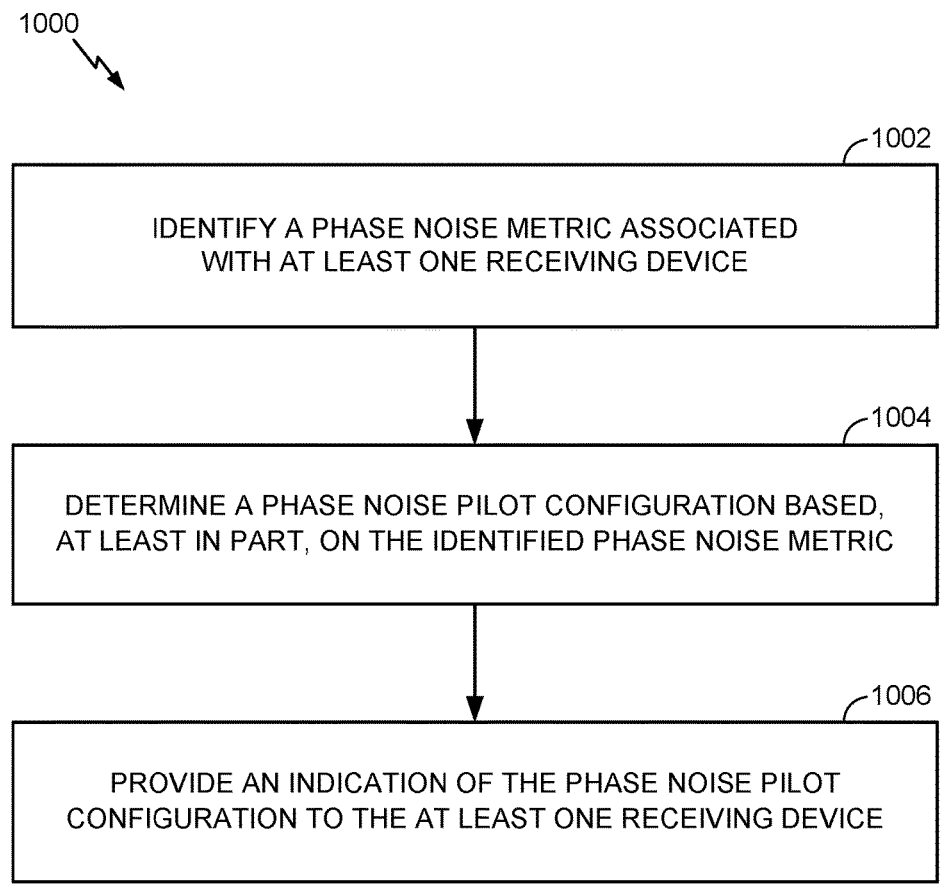
FIG. 10 is a flow diagram illustrating example operations that may be performed by a transmitting device for phase noise estimation in data symbols for mmW, in accordance with certain aspects of the present disclosure.

FIG. 10 illustrates example operations 1000 that may be performed by a transmitting device, for example, by a BS (e.g., BS 110 shown in FIG. 1) for downlink phase noise estimation in data symbols for mmW, in accordance with certain aspects of the present disclosure. Operations 1000 begin, at 1002, by identifying a phase noise metric associated with at least one receiving device (e.g., a UE 120). At 1004, the transmitting device determines a phase noise pilot configuration (e.g., presence, absence, and/or tone pattern of phase noise pilots) based, at least in part, on the identified phase noise metric. At 1006, the transmitting device provides an indication (e.g., implicitly via DCI parameters such as an MCS, explicitly via RRC signaling, or a combination of the two) of the phase noise pilot configuration to the at least one receiving device.

According to certain aspects, the plurality of pilot tones may be adjacent to each other. According to certain aspects, the phase noise metric can be determined based on a category associated with the receiving device, a transmission rank, a modulation and coding scheme (MCS), and/or a signal to interference and noise ratio (SINR) of a wireless link.

Figure 11:
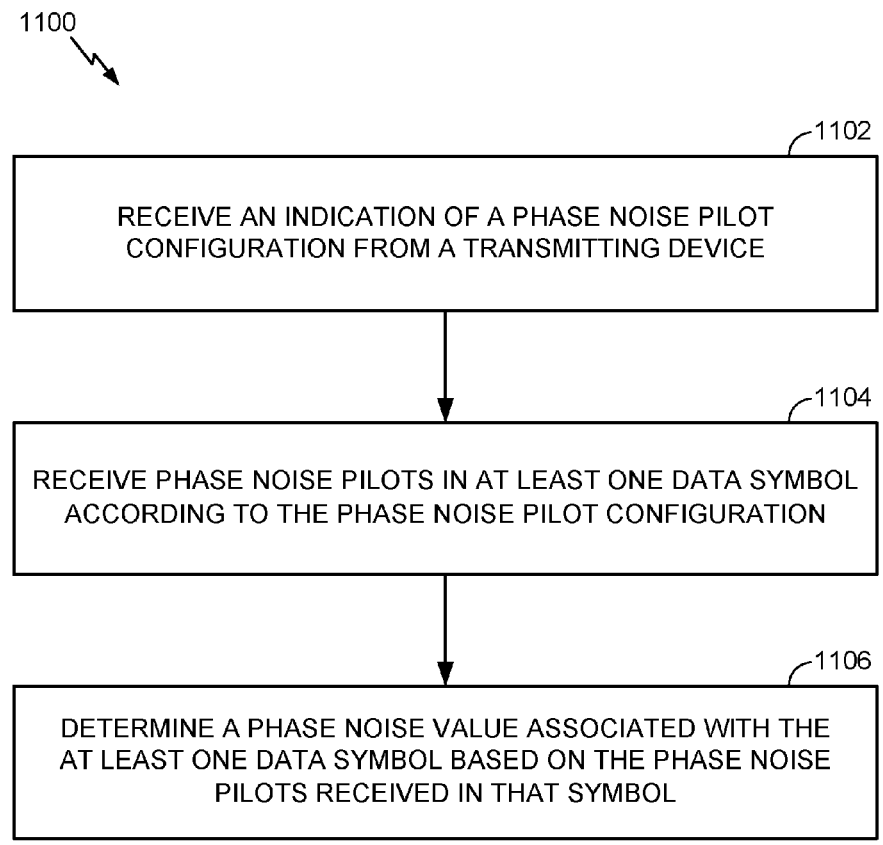
FIG. 11 is a block diagram illustrating example operations that may be performed by a receiving device for phase noise estimation in data symbols for mmW, in accordance with certain aspects of the present disclosure.

FIG. 11 illustrated example operations 1100 that may be performed a receiving device, such as a UE (e.g., a UE 120). Operations 1100 may be complementary operations to the operations 1000, performed by the transmitting device. Operations 1100 may begin, at 1102, by receiving an indication of a phase noise pilot configuration from a transmitting device. At 1104, the receiving device receives phase noise pilots in at least one data symbol according to the phase noise pilot configuration. At 1106, the receiving device determines a phase noise value associated with the at least one data symbol based on the phase noise pilots received in that symbol. The receiving device can mitigate the phase noise based on the estimation.

A subframe may have 14 symbols (e.g., 200 µs). According to certain aspects, symbols at the beginning a subframe may be used for control and channel estimation. The subframe may include a few symbols for demodulation reference signals (DM-RS) that may be used to estimate the channel. The remainder of the subframe may include data along with phase noise estimation pilot tones. The phase noise estimation pilot tones may be located at the center frequencies or other frequencies. The phase noise estimation pilot tones may carry phase noise reference signals used to estimate phase noise in the data symbols. Multiple UEs can be multiplexed in the time domain. In this case, phase noise may be estimated separately at/for each UE. If the phase noise varies quickly over time and/or if the phase noise mask is poor, phase noise mitigation pilots may be used in every symbol.

Example Phase Noise RS Configuration Determination/Indication

According to certain aspects, the phase noise RS configuration can be identified, determined, and/or indicated. For example, the phase RS configuration may be associated with a phase noise metric. The phase noise metric may provide an indication of the amount of phase noise expected for the receiving device. The transmitting device (e.g., a BS) can identify a phase noise metric associated with the receiving device (e.g., a UE) and determine the phase noise RS configuration based on the phase noise metric. The phase noise RS configuration may refer to presence or absence of phase noise RSs in a subframe and/or the pattern of the phase noise RSs in the subframe if phase noise RSs are present. According to certain aspects, the UE can identify, determine, and/or be indicated the phase noise RS configuration. For example, the UE may be explicitly indicated the phase noise RS configuration by radio resource control (RRC) signaling from the BS or the UE may be implicitly indicated the phase noise RS configuration, for example, based on the phase noise metric. In some cases, the phase noise RS configuration may be indicated to the UE based on a combination of explicit RRC signaling and implicitly via the phase noise metric, which may be indicated in downlink control information (DCI). For example, RRC signaling may configure whether phase noise RS are used in a subframe and, if phase noise RS are present in a subframe, various parameters indicated in DCI may be associated with the phase noise pilot pattern configured for the subframe. In some cases, the time domain density and/or the frequency domain density of the phase noise pilots may be associated with a modulation and coding scheme (MCS) indicated in DCI for the UE.

The phase noise metric may be identified based on various parameters. For example, such parameters may include an identifier of the UE (e.g., UE_ID), on a category of the UE, etc. The identifier or category may provide an indication of the type of the UE, for example, whether the UE is legacy UE using older equipment/oscillators, a modern device using newer equipment, a machine-type-communication (MTC) device, a machine-to-machine (M2M) device, etc. The phase noise metric may also be identified based on feedback information received from the UE (for example, based on messages received from the UE including information reporting the phase noise the UE has experienced). The phase noise metric may also be identified based on channel conditions and/or interference level associated with the UE (e.g., such as reported channel estimation parameters). The phase noise metric may also be identified based on a modulation-and-coding scheme (MCS) being used for transmissions to the UE. Other parameters may include carrier frequency offset (CFO) and/or Doppler correction parameters. Accordingly, the BS may have at least some indication of the extent of the phase noise associated with the UE, and the UE may have some indication of the phase noise RS configuration used by the BS. The BS may identify a phase noise metric for each associated UE.

According to certain aspects, presence of pilot tones in a subframe can be determined by a type of channel in which the pilot tones are included. For example, based on a type of physical downlink shared channel (PDSCH), system information block (SIB), paging, etc. In some cases, the determination based on the channel type may overwrite a determination of the existence of the pilot tones made based on another parameter, such as the MCS dependent determination of the existence of the pilot tones.

According to certain aspects, the BS can indicate the existence of the plurality of pilot tones by conveying an indication to the users in a physical downlink control channel (PDCCH). For example, the indication may be provided in a separate bit reserved in DCI.

Example Phase Noise RS Configurations

Figure 12:
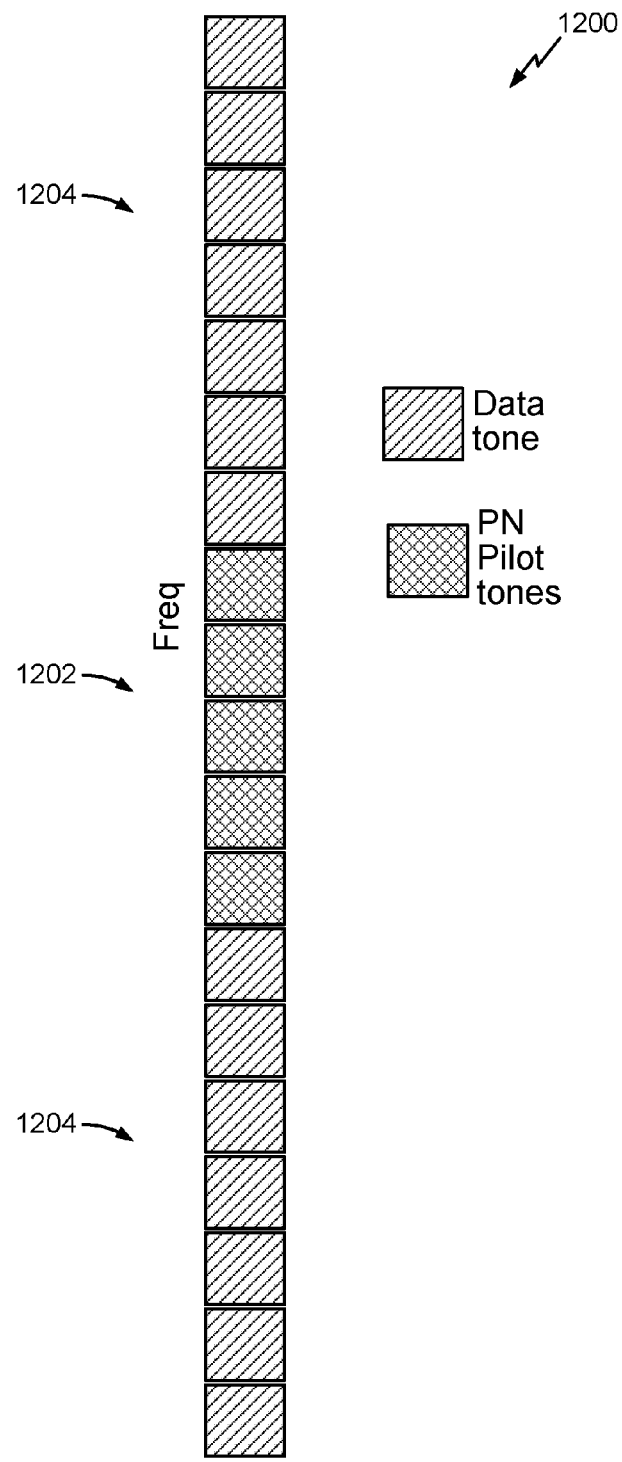
FIG. 12 illustrates an example phase noise reference signal configuration in a data symbol, in accordance with certain aspects of the present disclosure.

FIG. 12 illustrates an example phase noise compensation RS configuration in a symbol 1200, in accordance with certain aspects of the present disclosure. As shown in FIG. 12, phase noise RS may be presented in the symbol 1200 in multiple adjacent (e.g., contiguous) phase noise pilot tones 1202 (e.g., at center frequencies or other frequencies) which may be surrounded by data tones 1204. The UE can use the pilot tones 1202 to estimate phase noise in the data symbols 1204. For example, the channel may be derived from the DM-RS symbols; however, with the channel equalized, each symbol may potentially be corrupted by the phase noise variation. The pilot structure shown in FIG. 12 may enable recovery of the phase noise trajectory and removal of the phase noise.

According to certain aspects, the BS may transmit a known sequence (i.e., the phase noise RS) in the phase noise pilot tones 1202. As discussed above, the phase noise RS configuration (e.g., presence and pattern of the phase noise tones in a symbol/subframe) can be determined by the BS based on the phase noise metric of the UE (e.g., UE_ID, MCS, RRC signaled, etc.). The value of all of the phase noise pilots in a resource block (RB) may be generated on a per UE ID and/or a per Cell ID basis. The location of the phase noise pilots may frequency hop over the RB. In some cases, the location of the phase noise pilots may be a function of a UE ID. There may be multiple groups of phase noise pilots inside the symbol. The number of groups of phase noise pilots per RB may be a function of the channel selectivity. The width of the phase noise pilots may be function of the UE phase noise mask, the operating MCS, the signal-interference noise ratio (SINR), the transmission rank, or other parameters (e.g., which may be included in DCI) or be indicated by RRC signaling.

Example Phase Noise Estimation

Figure 13:
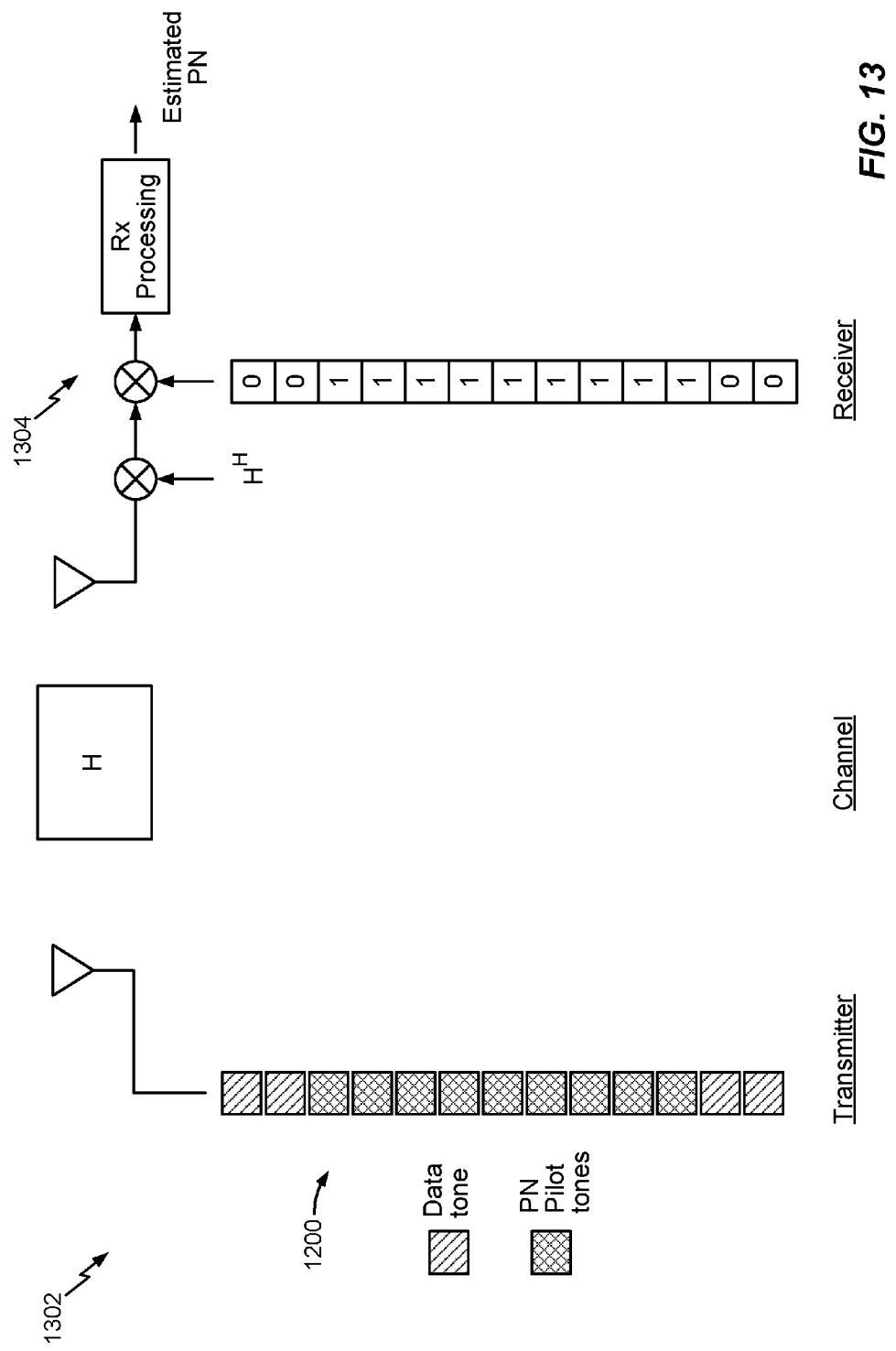
FIG. 13 is a block diagram conceptually illustrating example transmitter and receiver side operations for phase noise estimation in data symbols using phase noise pilot tones, in accordance with certain aspects of the present disclosure.

FIG. 13 is an example diagram conceptually illustrating transmitter-side 1302 and receiver-side 1304 operations for phase noise estimation in data symbols using phase noise pilot tones, in accordance with certain aspects of the present disclosure. As shown in FIG. 13, the transmit-side 1302 (e.g., a BS 110) may transmit a data symbol (e.g., the symbol 1200 shown in FIG. 12) with multiple contiguous phase noise pilot tones in the data symbol 1200. The receiver-side 1304 (e.g., a UE 120) may receive the data symbol 1200. The symbol may be represented as X(f), f=[1, Num_Subcarriers]. The receiver-side 1304 may estimate and equalize the channel H according to $Z(f)=X(f)*H^H(f)$, where "$^H$" represents the conjugate transpose, and where the estimate of the channel H may be from previous or forthcoming symbols. The receiver-side 1304 may receive the data and the phase noise pilots in the data symbol 1200 and process the data and pilots to produce a phase noise estimate. For example, the phase noise pilots (and any surrounding null tone locations) may be removed from $PN1(f)=Z(f)*Mask(f)$, where Mask is 1 only where one group of phase noise pilots is used. The extraction may be performed for all phase noise pilot locations in the same symbol.

According to certain aspects, multiple users may be spatially multiplexed for data transmission. In this case, the transmitter-side 1302 may determine the channel of the respective users and can identify existence of the plurality of pilot tones based on the determined channel. For example, the transmitter-side 1302 may determine if a transmission for one user interferes with a transmission of another user. If it does, then the transmitter-side 13-2 may insert the plurality of pilot tones as phase noise reference signals in both users' data streams even if only one out of these two users uses phase noise reference signals due to high MCS or low capability. If transmission for one user does not interfere with the other, the transmitter-side 1302 can insert the plurality of pilot tones in the data stream of the user that uses phase noise reference signals while the other user's data stream does not need to contain any pilots.

Example Phase Noise RS Configuration for Multiple Ports

Figure 14:
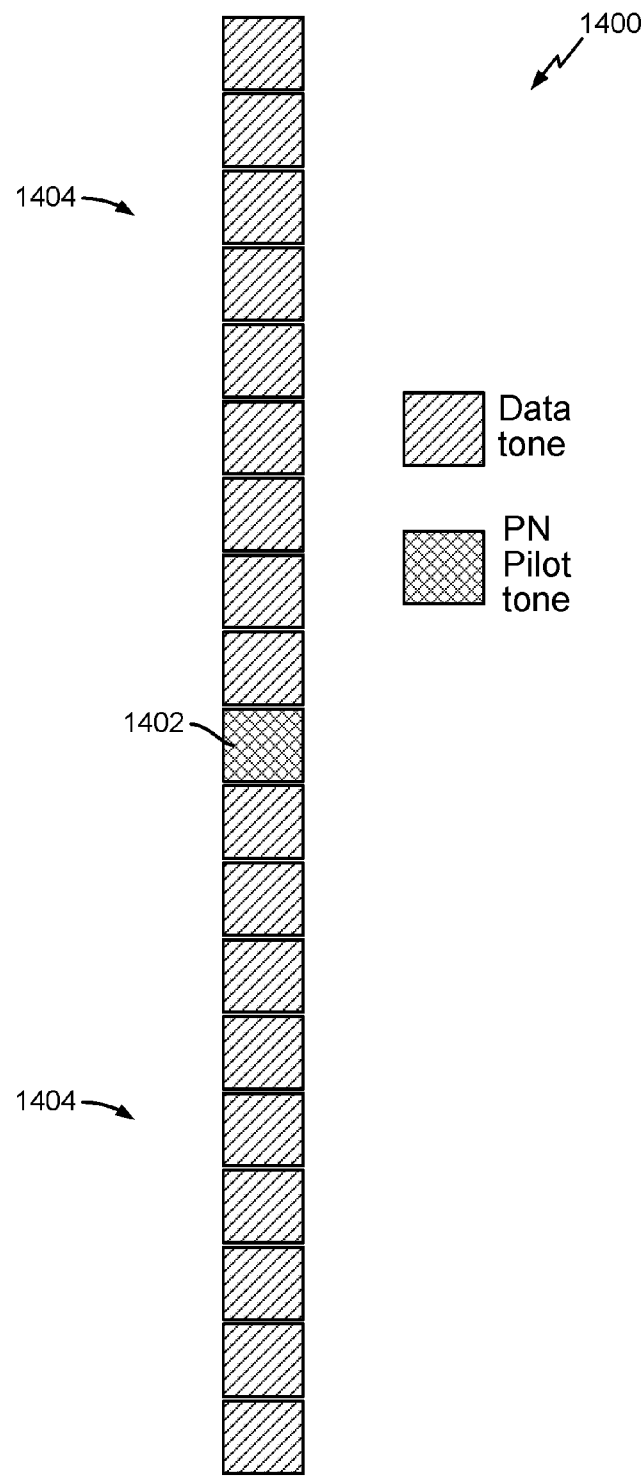
FIG. 14 illustrates an example phase noise reference signal configuration with one phase noise pilot per allocation, in accordance with certain aspects of the present disclosure.

In some scenarios, for a single port one phase noise reference signal tone 1402 may be used for every allocation of N resource blocks (RBs) allocation in a symbol 1400 as shown in FIG. 14. However, the single phase noise reference signal tone 1402 may be insufficient for the receiving device to estimate phase noise for multiple ports. According to certain aspects, pilots for different ports may be multiplexed.

Figure 15:
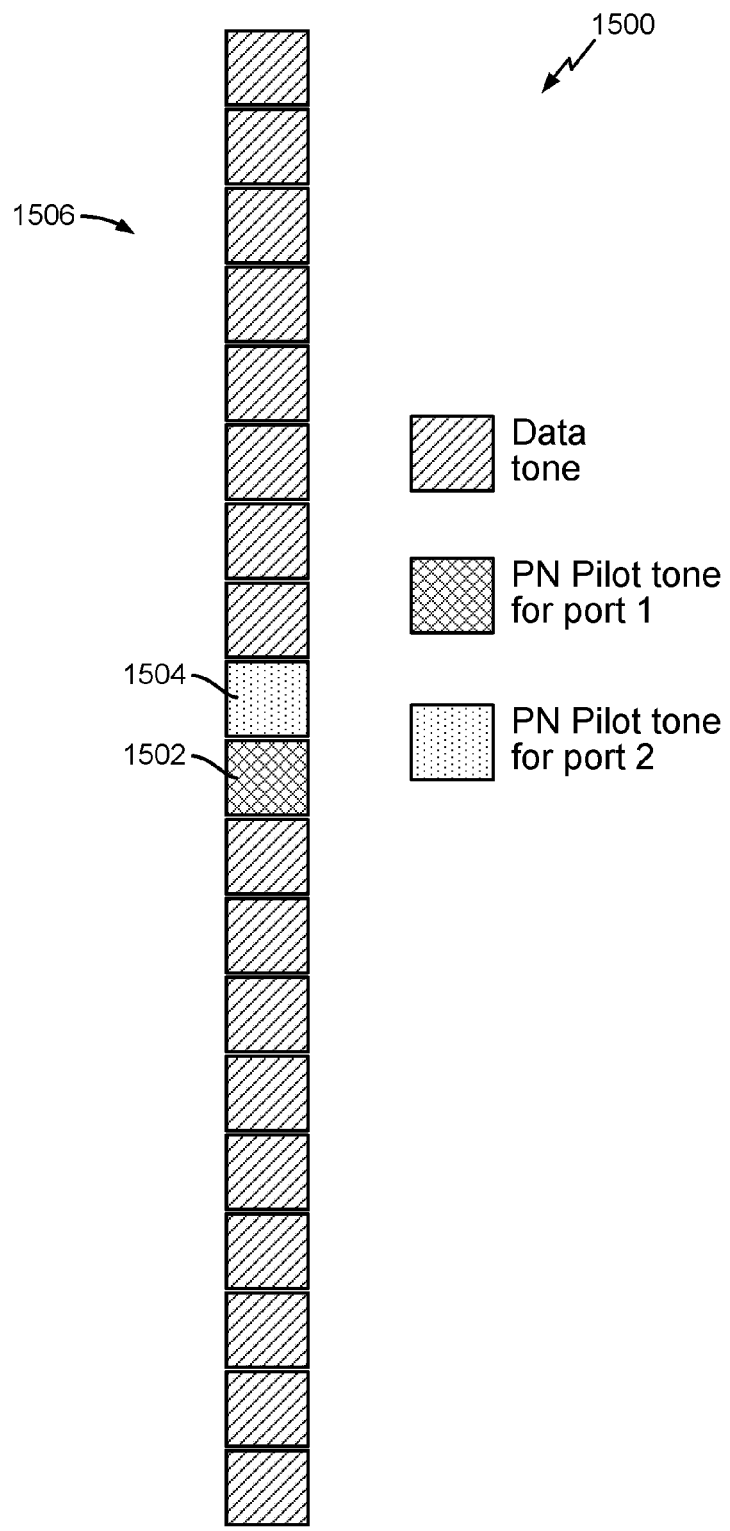
FIG. 15 illustrates an example phase noise reference signal configuration using frequency division duplexing (FDM) of pilot tones for two different transmit antenna ports, in accordance with certain aspects of the present disclosure.

According to certain aspects, phase noise reference signals may be frequency division multiplexed (FDM). For example, pilots for different antenna ports can be transmitted using different subcarriers (e.g., different frequency tones). For example, as shown in FIG. 15, a pilot for a first antenna transmit port (port 1) can be transmitted in a subcarrier 1502 and a pilot for a second antenna transmit port (port 2) can be transmitted in a different subcarrier 1504. This may allow the UE to estimate phase noise for multiple ports (i.e., port 1 using the pilot in subcarrier 1502 and port 2 using the pilot in subcarrier 1504). The different antenna ports may transmit data on the subcarriers 1506 using spatial multiplexing and/or FDM.

According to certain aspects, spreading may used for transmission of the phase noise pilots. For multiple transmit antenna ports, spreading codes can be selected such that the spreading is across both the time and frequency domain. In one example, Walsh codes can be used for spreading the PC-RS across both the time and frequency domain. Alternatively, different column vectors and/or different row vectors of a Hadamard matrix and/or a discrete Fourier transform (DFT) matrix could be used for spreading the phase noise pilots across both the time and frequency domain.

Figure 16:
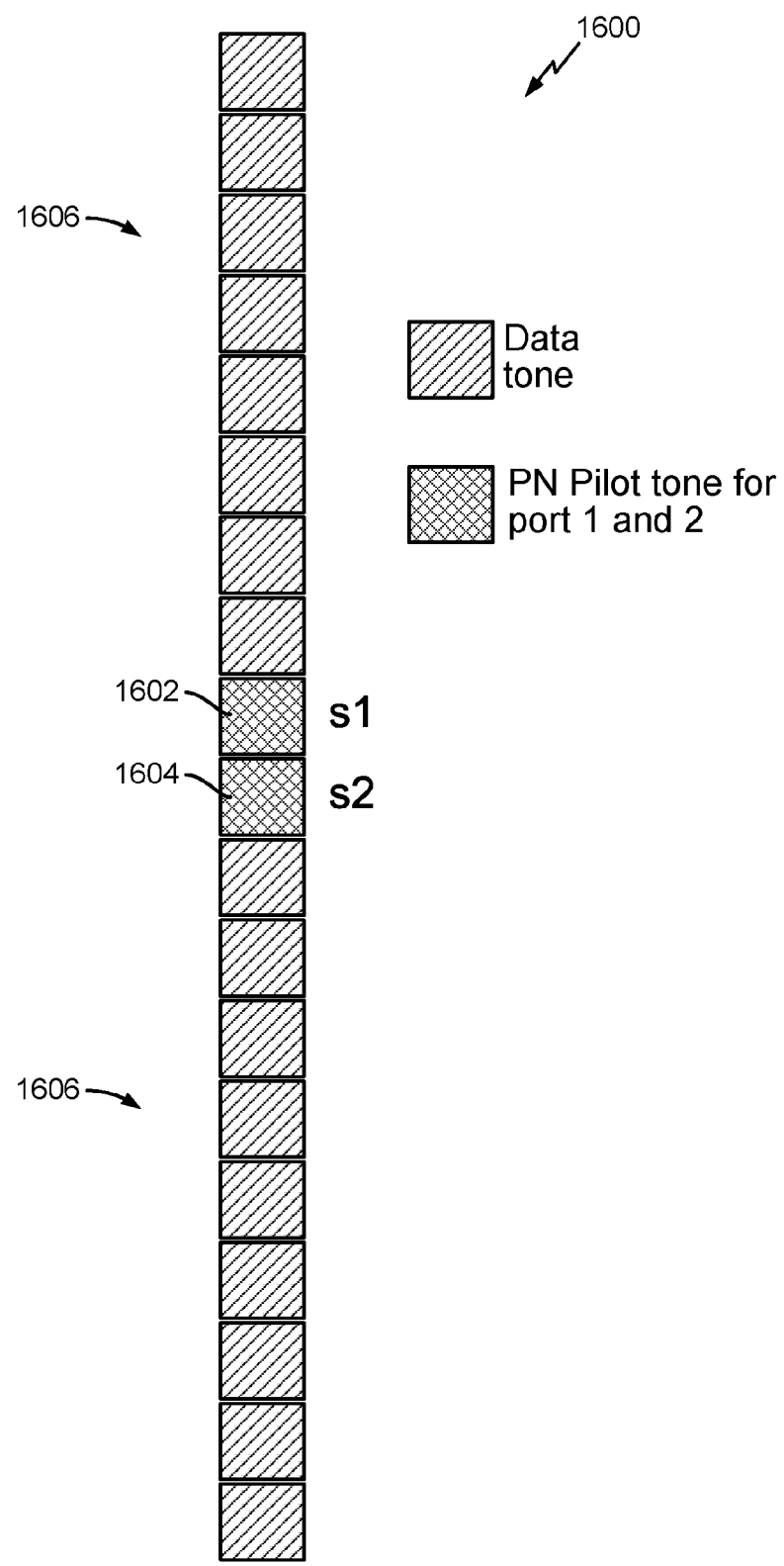
FIG. 16 illustrates an example phase noise reference signal configuration with different spreading of pilot tones for two different transmit antenna ports, in accordance with certain aspects of the present disclosure.

Pilots for different antenna ports may spread, for example, using different spreading codes in a symbol 1600 as shown in FIG. 16. This may allow the UE to estimate phase noise for the different antenna ports. s1 and s2 may denote different spreading using for phase noise pilots 1602 and 1604 transmitted by two different ports (e.g., port 1 and port 2), respectively. A and B may denote the different spreading codes (s1, s2) used by the two different ports for the spreading, where A can be [a1 a2] and B can be [b1 b2]. For example, A could be [+1 −1] and B could be [+1-1]. Thus, after spreading, the signal across these two tones 1602, 1604 may be given by S=[a1 a2]*p0+[b1 b2]*p1, where p0 and p1 are the pilots of the respective transmit antenna ports. The two vectors may be generated by using length two Walsh codes, for example, or a different spreading code. The transmitting device may also transmit data on the tones 1606 using spatial multiplexing and/or FDM.

According to certain aspects, different spreading codes may be used for different numbers of transmit antenna ports, different column vectors of a Hadamard matrix may be used for different transmit antenna ports, and/or different column vectors of a discrete Fourier transform (DFT) matrix may be used for different transmit antenna ports.

Use of multiplexing and/or different spreading codes for phase noise pilots may useful for estimating and compensating phase noise of different transmit antenna ports, for estimating and compensating phase noise of the BS in downlink transmission, and/or for estimating and compensating phase noise of the UE in uplink transmission. Use of multiplexing and/or different spreading codes may be useful even where multiple pilot tones are used per antenna port. For example, different spreading codes could be used for different numbers of antenna ports even if each port uses multiple pilot tones.

Figure 17:
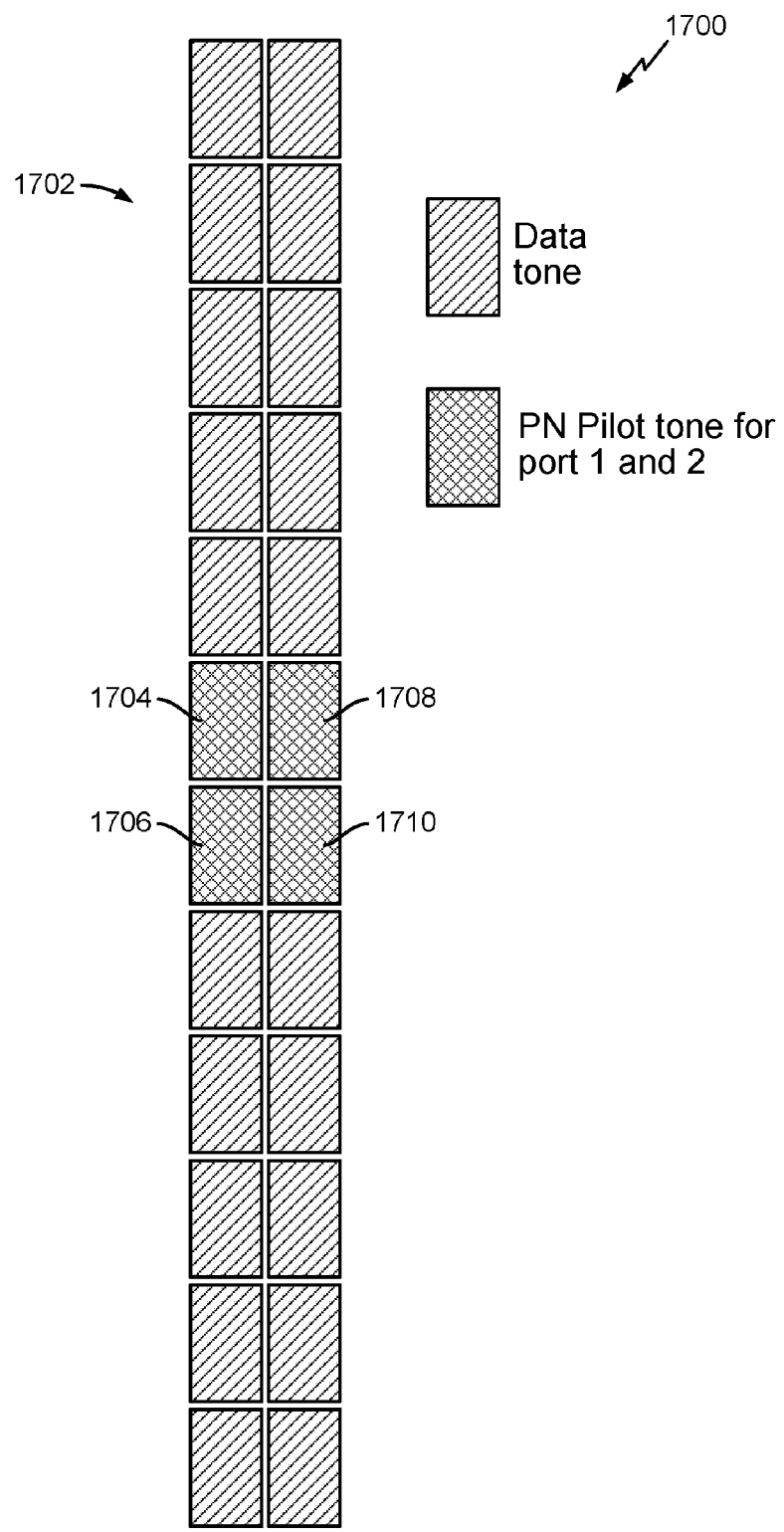
FIG. 17 illustrates an example phase noise reference signal configuration with spreading of pilot tones for two different transmit antenna ports in two different symbols, in accordance with certain aspects of the present disclosure.

According to certain aspects, phase noise pilots may be spread across different symbols. The spreading can be in both the time and frequency domain, which may allow randomization of pilot transmission. FIG. 17 illustrates an example phase noise configuration with spreading of pilot tones for two different transmit antenna ports in two different symbols 1700 and 1702, in accordance with certain aspects of the present disclosure. As shown in FIG. 17, in symbol 1700, the phase noise pilot for the antenna port 1 can be spread, for example, by a first spreading (e.g., [+1 1]) and placed in two tones 1704, 1706, and the phase noise pilot for antenna port 2 can be spread with a different spreading (e.g., [+1 −1]) and placed in the tones 1704, 1706. In the symbol 1702, the phase noise pilots for the antenna port 1 can be spread, for example, by yet another spreading code (e.g., [−1 −1]) and placed in two tones 1708, 1710, and the pilots for the antenna port 2 can be spread by yet another spreading code (e.g., [−1 +1]) and placed in the tones 1708, 1710. The overall spreading matrix in this example is:

$$\begin{bmatrix} 1 & 1 & -1 & -1 \\ 1 & -1 & -1 & 1 \end{bmatrix}$$

where the first and third columns denote the spreading vectors for port 1 and the second and fourth columns denote the spreading vectors for port 2 in symbols 1700 and 1702, respectively. Thus, each port has phase noise pilots with different spreadings across two symbols, and phase noise pilots for different ports use different spreadings in different tones in the same symbol.

Figure 18:
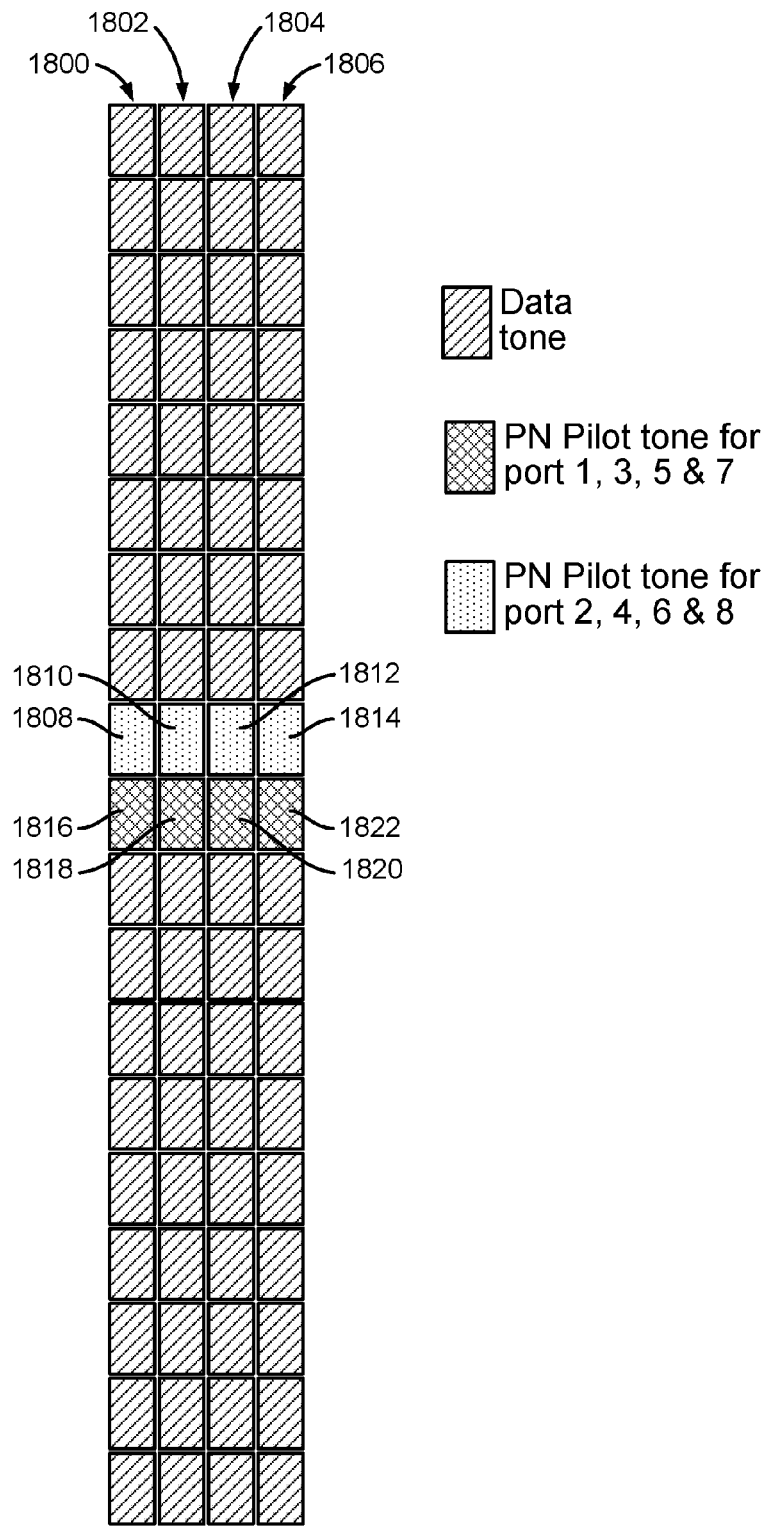
FIG. 18 illustrates an example phase noise reference signal configuration showing pilot tones for four different transmit antenna ports, in accordance with certain aspects of the present disclosure.

FIG. 18 illustrates another example phase noise pilot configuration showing pilot tones for eight different transmit antenna ports, in accordance with certain aspects of the present disclosure. As shown in FIG. 18, the PN pilot tones 1808, 1810, 1812, and 1814 may be used for ports 1, 3, 5, 7 and PN pilot tones 1816, 1818, 1820, and 1822 may be used for ports 2, 4, 6, and 8. In the example shown in FIG. 18, for each port, the BS may use 1 bit to indicate the associated index for the port and the corresponding tones.

As discussed above, the BS can indicate the PN pilot configuration to the UE. According to certain aspects, the BS may inform (e.g., signal an indication) the receiving device (e.g., the UE) of the spreading and/or multiplexing. For example, when different panels/transmission points/transmit ports are co-located (e.g., sharing the same oscillator), different spreading codes, Walsh codes, or other spreading can be used to allow multiplexing of tones used for different pilots and the BS may inform the UE of the spreading. Alternatively, when the different panels/TP/transmit ports are not co-located, the BS can disable spreading of pilots used for different panels/TPs/ports and can inform the UE that spreading is not used.

According to certain aspects, the informing may be via radio resource control (RRC) signaling or via the physical downlink control channel (PDCCH). Bits may be reserved in downlink control information (DCI) format to convey the configuration.

Example Rate Matching of PC-RS Tones

According to certain aspects, the number of pilot tones can be fixed. For example, the number of pilot tones may be same irrespective of the number of transmit antenna ports. This may reduce overhead when the number of transmit antenna ports is high, for example, and/or in scenarios where the signals from some ports do not interfere (e.g., beamforming may reduce the interference between some ports' signals and the tones carrying those signals, therefore, may not be code/frequency division multiplexed).

According to certain aspects, the BS may indicate (e.g., inform) the receiving device (e.g., the UE) about the mapping between transmit antenna port index and corresponding tone location. The indication may be provided via RRC signaling or via a PDCCH (e.g., via separate bits reserved in DCI).

The techniques discussed herein are discussed from the perspective of the transmitting device and receiving device. For downlink phase noise estimation, the transmitting device may be the BS and receiving device may the UE. For uplink phase noise estimation, the transmitting device may be the UE and the receiving device may be the BS.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, means for signaling, and/or means for obtaining may include one or more processors, transmitters, receivers, and/or other elements of the user equipment 120 and/or the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by a transmitting device, comprising:
    identifying a phase noise metric associated with at least one receiving device;
    determining a phase noise pilot configuration based, at least in part, on the identified phase noise metric; and
    providing an indication of the phase noise pilot configuration to the at least one receiving device via at least one of a radio resource control (RRC) signaling, a physical downlink control channel (PDCCH), or a downlink control information (DCI),
    wherein presence of phase noise pilots in a subframe is indicated via the RRC signaling and a tone pattern for the phase noise pilots is indicated implicitly by one or more parameters carried in the DCI.

2. The method of claim 1, wherein determining the phase noise pilot configuration comprises:
    determining whether to transmit the phase noise pilots in a particular subframe; and
    if the phase noise pilots are to be transmitted in the particular subframe, determining a tone pattern for transmitting the phase noise pilots in the particular subframe.

3. The method of claim 1, wherein the phase noise metric is identified based on a modulation and coding scheme (MCS) associated with the receiving device.

4. The method of claim 1, wherein the one or more parameters includes a modulation and coding scheme (MCS).

5. The method of claim 1, wherein the indication of the phase noise pilot configuration indicates at least one of: a configuration according to which the transmitting device will transmit phase noise pilots or a configuration according to which the receiving device should transmit phase noise pilots.

6. The method of claim 1, wherein determining the phase noise pilot configuration comprises:
selecting a plurality of adjacent tones in at least one data symbol for transmission of the phase noise pilots, wherein the selection is based at least in part on the identified phase noise metric.

7. The method of claim 6, wherein the plurality of adjacent tones for transmission of the phase noise pilots are surrounded by tones used for transmission of data.

8. The method of claim 1, wherein determining the phase noise pilot configuration comprises:
multiplexing the phase noise pilots for different transmit antenna ports.

9. The method of claim 8, wherein the multiplexing comprises at least one of: frequency division multiplexing (FDM), time division multiplexing (TDM), or code division multiplexing (CDM) using different spreading codes for transmitting different phase noise pilots using different antenna ports.

10. A method for wireless communication by a receiving device, comprising:
receiving an indication of a phase noise pilot configuration from a transmitting device via at least one of a radio resource control (RRC) signaling, a physical downlink control channel (PDCCH), or a downlink control information (DCI), wherein presence of phase noise pilots in a subframe is indicated via the RRC signaling and a tone pattern for the phase noise pilots is indicated implicitly by one or more parameters carried in the DCI;
receiving the phase noise pilots in at least one data symbol according to the phase noise pilot configuration; and
determining a phase noise value associated with the at least one data symbol based on the phase noise pilots received in that symbol.

11. The method of claim 10, further comprising:
providing an indication of a phase noise metric associated with the receiving device to the transmitting device.

12. The method of claim 11, wherein the phase noise metric is provided by a modulation and coding scheme (MCS) associated with the receiving device.

13. The method of claim 10, wherein the phase noise pilot configuration comprises:
an indication of whether the phase noise pilots are transmitted in a particular subframe; and
if the phase noise pilots are to be transmitted in the particular subframe, determining a tone pattern for transmitting the phase noise pilots in the particular subframe.

14. The method of claim 10, wherein the one or more parameters includes a modulation and coding scheme (MCS).

15. The method of claim 10, wherein the indication of the phase noise pilot configuration indicates at least one of: a configuration according to which the transmitting device will transmit phase noise pilots or a configuration according to which the receiving device should transmit phase noise pilots.

16. The method of claim 10, wherein the phase noise pilot configuration comprises:
a plurality of adjacent tones in at least one data symbol for transmission of the phase noise pilots.

17. The method of claim 16, wherein the plurality of adjacent tones for transmission of the phase noise pilots are surrounded by tones used for transmission of data.

18. An apparatus for wireless communication by a transmitting device, comprising:
at least one processor coupled with a memory and configured to identify a phase noise metric associated with at least one receiving device and determine a phase noise pilot configuration based, at least in part, on the identified phase noise metric; and
a transmitter configured to provide an indication of the phase noise pilot configuration to the at least one receiving device via at least one of a radio resource control (RRC) signaling, a physical downlink control channel (PDCCH), or a downlink control information (DCI),
wherein presence of phase noise pilots in a subframe is indicated via the RRC signaling and a tone pattern for the phase noise pilots is indicated implicitly by one or more parameters carried in the DCI.

19. The apparatus of claim 18, wherein the at least one processor is configured to determine the phase noise pilot configuration by:
determining whether to transmit the phase noise pilots in a particular subframe; and
determining a tone pattern for transmitting the phase noise pilots in the particular subframe if the phase noise pilots are to be transmitted in the particular subframe.

20. An apparatus for wireless communication by a receiving device, comprising:
a receiver configured to:
receive an indication of a phase noise pilot configuration from a transmitting device via at least one of a radio resource control (RRC) signaling, a physical downlink control channel (PDCCH), or a downlink control information (DCI); and
receive phase noise pilots in at least one data symbol according to the phase noise pilot configuration, wherein presence of phase noise pilots in a subframe is indicated via the RRC signaling and a tone pattern for the phase noise pilots is indicated implicitly by one or more parameters carried in the DCI; and
at least one processor coupled with a memory and configured to determine a phase noise value associated with the at least one data symbol based on the phase noise pilots received in that symbol.

21. The apparatus of claim 20, wherein the apparatus further comprises:
a transmitter configured to provide an indication of a phase noise metric associated with the receiving device to the transmitting device.

22. The apparatus of claim 20, wherein the phase noise pilot configuration comprises:
an indication of whether the phase noise pilots are transmitted in a particular subframe; and
if the phase noise pilots are to be transmitted in the particular subframe, determine a tone pattern for transmitting the phase noise pilots in the particular subframe.

23. The apparatus of claim 21, wherein the phase noise metric is provided by a modulation and coding scheme (MCS) associated with the receiving device.

* * * * *